US011598681B2

(12) United States Patent
Sun et al.

(10) Patent No.: US 11,598,681 B2
(45) Date of Patent: Mar. 7, 2023

(54) SENSOR WITH TIME-SHARING REGIONAL SHIELDING FUNCTION, ELECTRONIC SKIN AND ROBOT

(71) Applicant: Beijing Tashan Technology Co., Ltd., Beijing (CN)

(72) Inventors: Tengchen Sun, Beijing (CN); Dahua Zhang, Beijing (CN); Wei Zhuang, Beijing (CN)

(73) Assignee: Beijing Tashan Technology Co., Ltd., Beijing (CN)

( * ) Notice: Subject to any disclaimer, the term of this patent is extended or adjusted under 35 U.S.C. 154(b) by 115 days.

(21) Appl. No.: 16/966,492

(22) PCT Filed: May 23, 2018

(86) PCT No.: PCT/CN2018/000191
§ 371 (c)(1),
(2) Date: Jul. 31, 2020

(87) PCT Pub. No.: WO2019/148306
PCT Pub. Date: Aug. 8, 2019

(65) Prior Publication Data
US 2021/0041309 A1 Feb. 11, 2021

(30) Foreign Application Priority Data
Jan. 31, 2018 (CN) .......................... 201810093888.6

(51) Int. Cl.
*G01L 1/14* (2006.01)
*B25J 13/08* (2006.01)
*G01L 5/165* (2020.01)

(52) U.S. Cl.
CPC ............. *G01L 1/146* (2013.01); *B25J 13/085* (2013.01); *G01L 5/165* (2013.01)

(58) Field of Classification Search
CPC ............ G01L 1/146; G01L 1/144; H01G 2/22
See application file for complete search history.

(56) References Cited

U.S. PATENT DOCUMENTS 4,584,625 A 4/1986 Kellogg
4,621,227 A * 11/1986 Venema ............. G01R 27/2605
324/678

(Continued)

FOREIGN PATENT DOCUMENTS

| CN | 102483667 A | 5/2012 |
|---|---|---|
| CN | 106706176 A | 5/2017 |
| DE | 69808073 T2 | 6/2003 |

OTHER PUBLICATIONS

Satoshi, T. et al. "Tacticle and Proximity Sensor Using Self-Capacitance Measurement on Curved Surface" 2017 International Conference on Industrial Technology, May 4, 2017 (May 4, 2017), pp. 934-937, sections 2-4, and figures 2 and 3.

(Continued)

*Primary Examiner* — Tran M. Tran
(74) *Attorney, Agent, or Firm* — Edwin A. Sisson, Attorney at Law, LLC; Jeffrey J. Banyas

(57) ABSTRACT

The present application relates to a sensor with a time-sharing regional shielding function and a robot. The sensor comprises a plurality of sensor units, each of which comprises regions contained in four multifunctional layers. Four parallel-plate capacitors are contained in the multifunctional layers. The multifunctional layers realize the regional shielding function through the time-sharing switching of analog switches and the control of a bus.

11 Claims, 14 Drawing Sheets

(56) References Cited

U.S. PATENT DOCUMENTS

| | | | | |
|---|---|---|---|---|
| 5,469,070 | A * | 11/1995 | Koluvek | G01R 27/14 324/425 |
| 5,578,765 | A | 11/1996 | Franz | |
| 6,756,790 | B2 * | 6/2004 | Yakabe | G01R 27/02 324/684 |
| 6,940,292 | B2 * | 9/2005 | Laila | G01D 5/24 324/661 |
| 7,403,020 | B2 * | 7/2008 | Braun | G01R 27/2605 324/686 |
| 7,679,376 | B2 * | 3/2010 | Kang | G06F 3/0446 324/686 |
| 7,898,217 | B2 * | 3/2011 | Nate | H02J 7/00 320/135 |
| 8,164,354 | B2 * | 4/2012 | Lenz | H03K 17/955 324/687 |
| 8,688,393 | B2 * | 4/2014 | Wu | G01R 27/2605 463/16 |
| 8,692,565 | B2 * | 4/2014 | Togura | H03K 17/955 324/600 |
| 8,922,223 | B2 * | 12/2014 | Suzuki | G01R 31/64 327/261 |
| 9,400,195 | B2 * | 7/2016 | Verburg | G01D 5/24 |
| 9,644,995 | B2 * | 5/2017 | Verburg | G01D 5/24 |
| 10,003,334 | B2 * | 6/2018 | Fasshauer | G06F 3/044 |
| 10,153,088 | B2 * | 12/2018 | Kessler | H01G 4/385 |
| 10,153,094 | B2 * | 12/2018 | Mehta | H01G 2/22 |
| 10,168,814 | B2 * | 1/2019 | Hotelling | G06F 3/0445 |
| 10,242,792 | B2 * | 3/2019 | Miyahara | H01F 27/29 |
| 10,267,700 | B2 * | 4/2019 | Teipen | G01L 19/04 |
| 10,395,837 | B2 * | 8/2019 | Chong | H01B 3/12 |
| 10,817,114 | B2 * | 10/2020 | Sasai | H03K 17/955 |
| 10,969,248 | B2 * | 4/2021 | Lakatos | B60K 37/06 |
| 11,009,409 | B2 * | 5/2021 | Hirai | G01R 19/0084 |
| 11,209,272 | B2 * | 12/2021 | Haneda | G01C 19/5614 |
| RE48,901 | E * | 1/2022 | Verburg | G03F 9/7053 |
| 11,243,237 | B2 * | 2/2022 | Bahnmueller | G01R 27/2605 |
| 2006/0033507 | A1 * | 2/2006 | Gaumel | B60R 21/01532 324/658 |
| 2008/0122454 | A1 * | 5/2008 | Kato | G01D 3/032 324/661 |
| 2008/0174321 | A1 | 7/2008 | Kang et al. | |
| 2011/0273192 | A1 * | 11/2011 | Huang | G06F 3/044 324/678 |
| 2015/0370396 | A1 | 12/2015 | Hotelling et al. | |

OTHER PUBLICATIONS

Lu Xiaozhou et al., "Three-Dimensional Interfacial Stress Decoupling Method for Rehabilitation Therapy Robot", IEEE Transactions on Industrial Electronics, May 1, 2017, pp. 3970 to 3977, vol. 64, No. 5, IEEE Service Center, Piscataway, NJ, U.S.A.

Hyung-Kew Lee et al., "Dual-Mode Capacitive Proximity Sensor for Robot Application: Implementation of Tactile and Proximity Sensing Capability on a Single Polymer Platform Using Shared Electrodes", IEEE Sensors Journal, Dec. 1, 2009, pp. 1748 to 1755, vol. 9, No. 12, IEEE Service Center, New York, NY, U.S.A.

Hyung-Kew Lee et al., "Normal and Shear Force Measurement Using a Flexible Polymer Tactile Sensor with Embedded Multiple Capacitors", Journal of Microelectromechanical Systems, Aug. 1, 2008, pp. 934-942, vol. 17, No. 4, IEE Service Center, U.S.A.

* cited by examiner

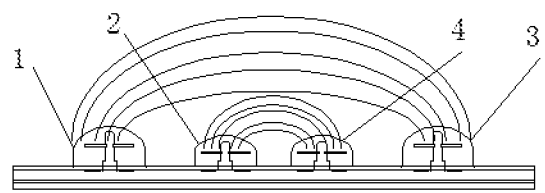
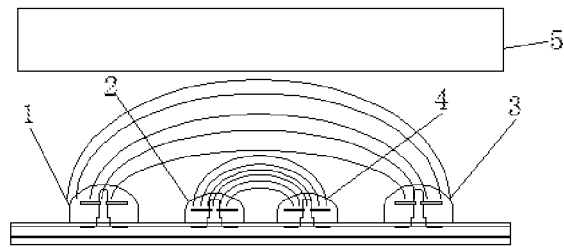
FIG. 7  FIG. 8
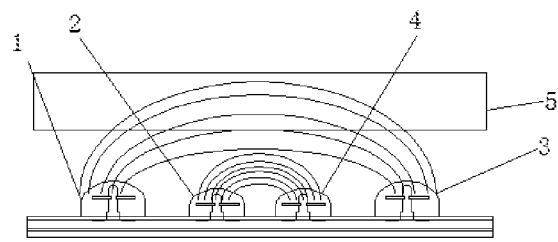
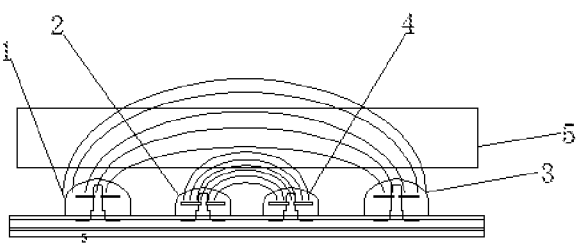
FIG. 9  FIG. 10
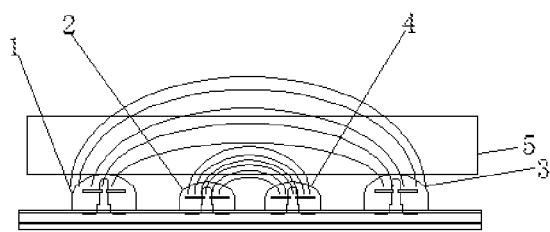
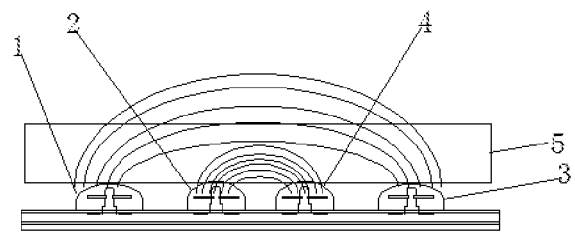
FIG. 11  FIG. 12
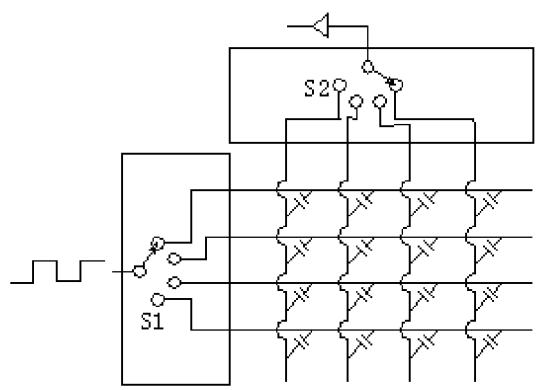
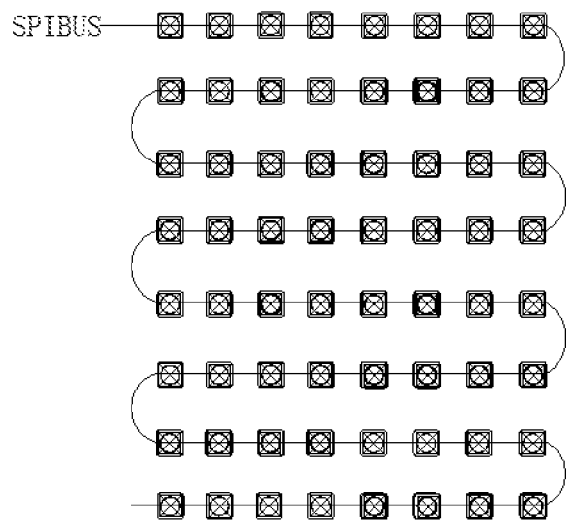
FIG. 13  FIG. 14

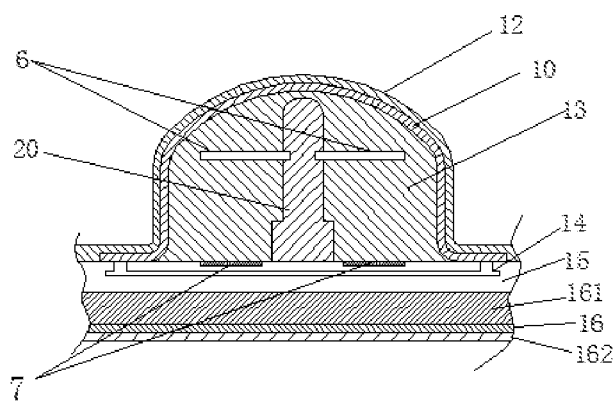
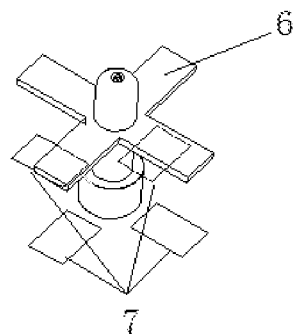
FIG. 15　　　　　　　　　　　FIG. 16
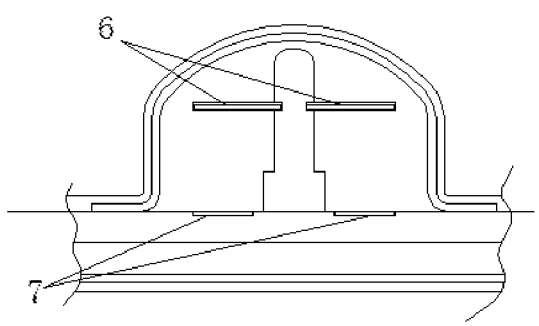
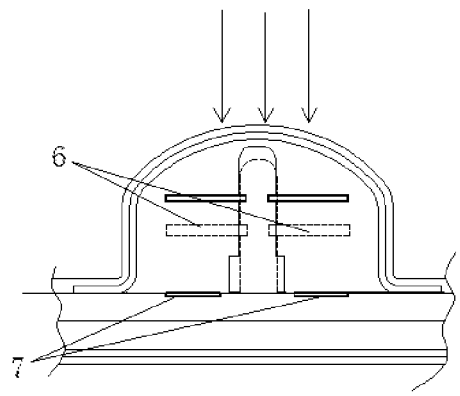
FIG. 17　　　　　　　　　　　FIG. 18
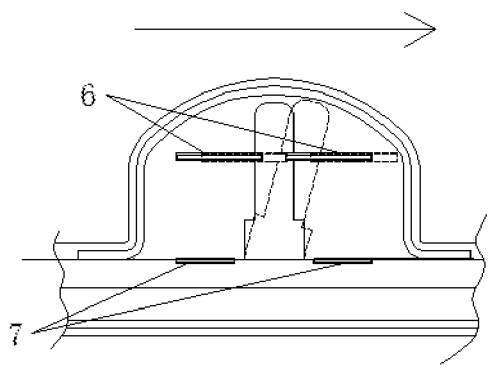
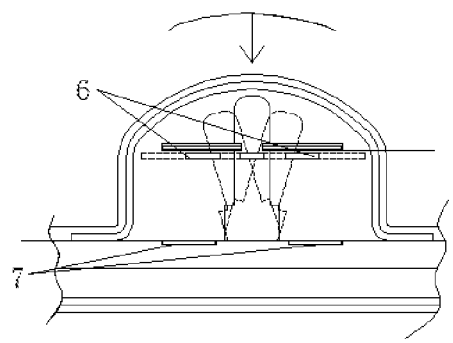
FIG. 19　　　　　　　　　　　FIG. 20

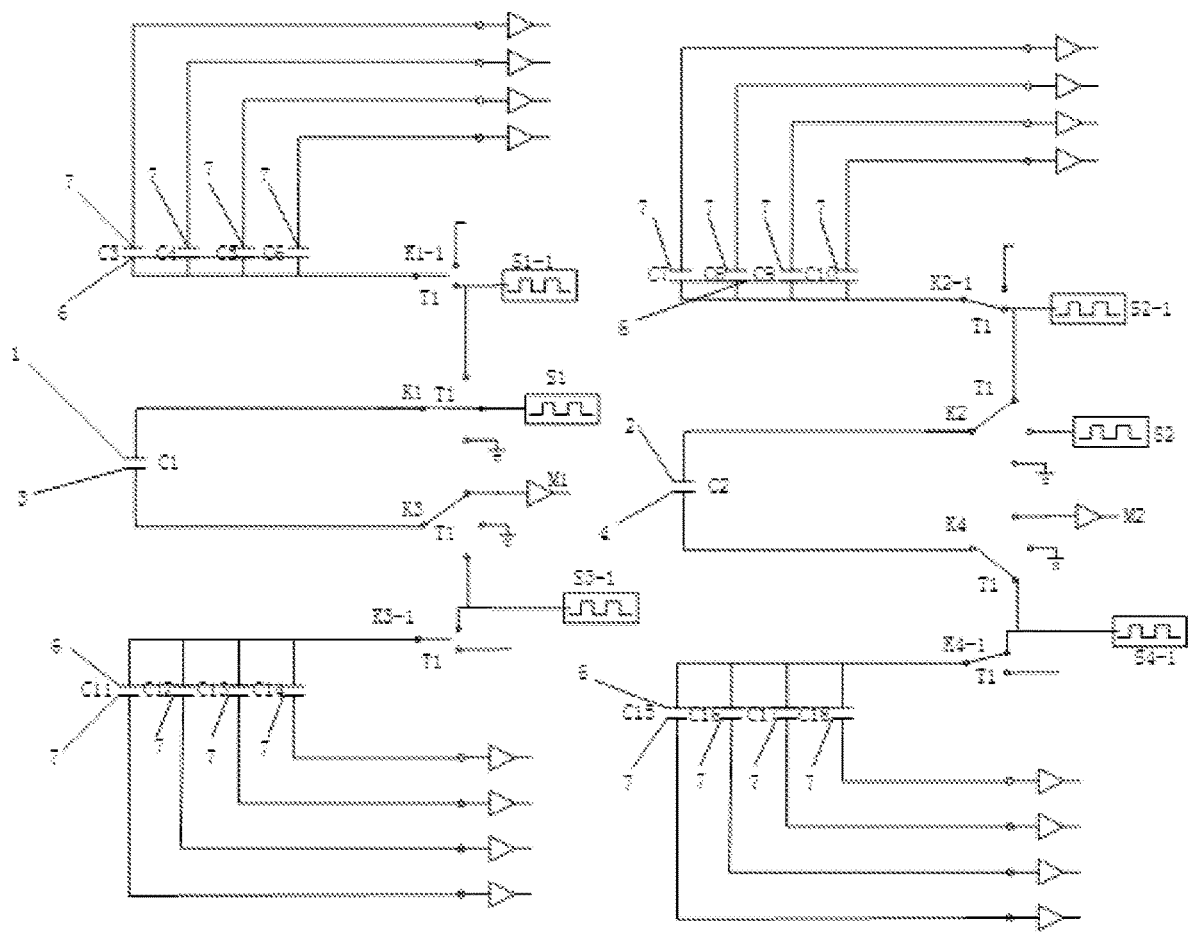
Fig. 21a`

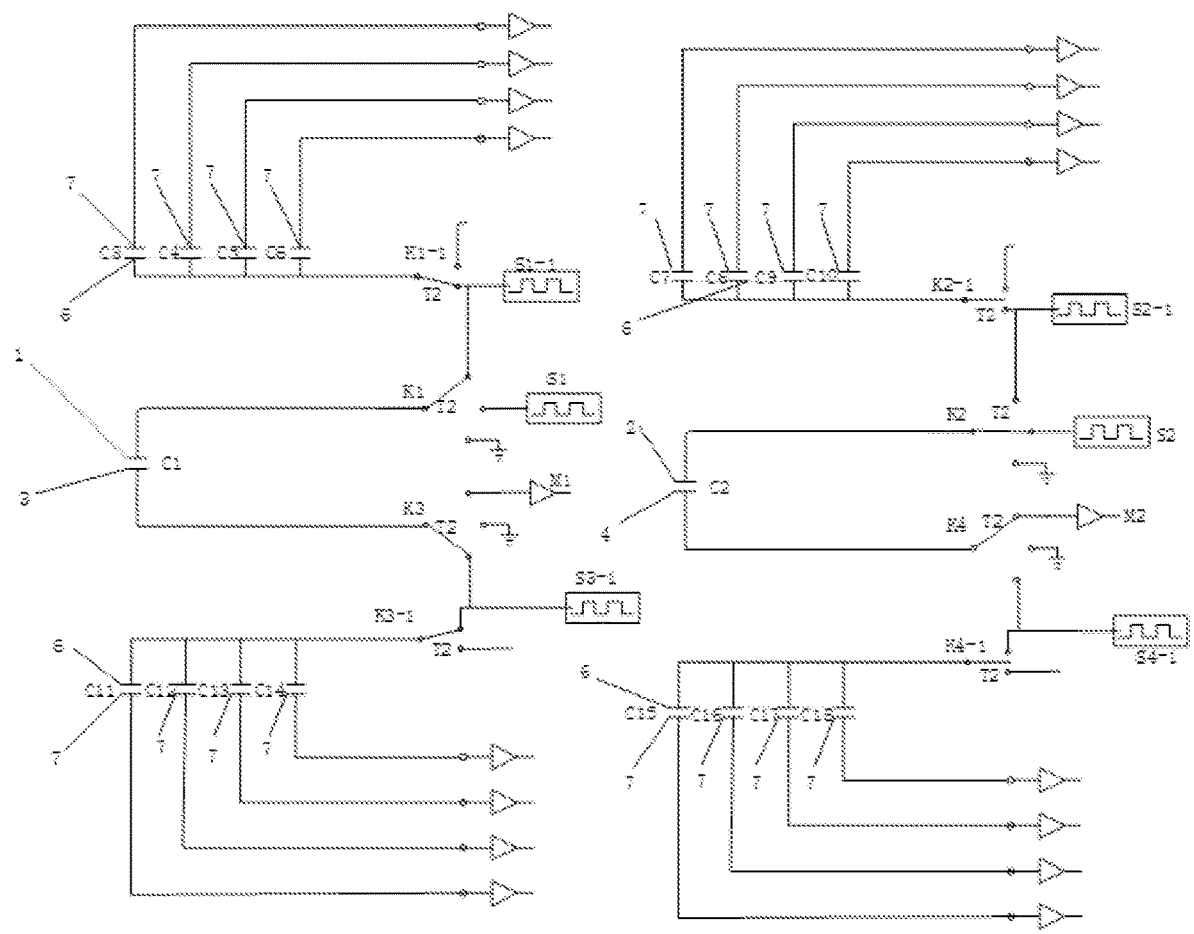
Fig. 21b`

SENSOR WITH TIME-SHARING REGIONAL SHIELDING FUNCTION, ELECTRONIC SKIN AND ROBOT

PRIORITIES AND CROSS REFERENCES

This Application claims priority from International Application No. PCT/CN2018/000191 filed on 23 May 2018 and Chinese Application No. 201810093888.6 filed on 31 Jan. 2018, the teachings of each of which are incorporated by reference herein in their entirety.

PRIORITIES AND CROSS REFERENCES

This Application claims priority from International Application No. PCT/CN2018/000191 filed on 23 May 2018 and Chinese Application No. 201810093888.6 filed on 31 Jan. 2018, the teachings of each of which are incorporated by reference herein in their entirety.

TECHNICAL FIELD

The present application relates to a sensor with a time-sharing regional shielding function, electronic skin and a robot, and is applied in the technical field of artificial intelligence.

BACKGROUND

Recently, intelligent robots have entered the large-scale practical stage in the industrial field. Intelligent robots require intelligent sensors, mainly including visual sensors, auditory sensors, tactile sensors and olfactory sensors, to imitate various sensory functions so as to realize the interaction with the outside world. Up to now, visual sensors and auditory sensors have become mature and have been widely applied in the field of industrial robots. However, with the deep application of intelligent robots in various fields of human activities, robots particularly in fields of agriculture, family services, medical services and hotel and restaurant services are required to complete more flexible and complex actions. Meanwhile, due to the closer contact of robots in these fields with human beings, the safety and comfort of the contact between the robots and the human beings must be ensured. Therefore, highly-sensitive tactile sensors with human-like tactile functions become more and more important. Bionic tactile sensors have been extensively studied all over the world.

Intelligent tactile sensors should have the following basic functions.

Touch sensing: when a limb of an intelligent robot is about to touch or just touches an object, the intelligent robot should be able to roughly classify the object that is to be touched or just touched and determine the approaching speed and distance. For example, a serving robot should be able to recognize whether the object that is to be touched or just touched is a limb of a human being or other objects; an agricultural harvesting robot should be able to recognize whether the object that is to be touched or just touched is fruit, cotton or plant leaves. Meanwhile, the intelligent robot should be able to determine the approaching speed and distance, so that the intelligent robot can properly control the initial speed at which the limb approaches or touches the object, so as to avoid injuring the human body to be touched or damaging the object to be touched.

Stress sensing and slide sensing: when the limb of the intelligent robot touches an object, the intelligent robot should be able to sense the magnitude and direction of the applied three-dimensional stress, so that the intelligent robot can control the three-dimensional stress applied to the object in a proper range. For example, when a serving robot picks up a teacup, the serving robot should control the three-dimensional stress applied to the teacup, so that the teacup will not be broken or will not fall. In addition, when the limb of the intelligent robot slides on an object, the intelligent robot should be able to sense the sliding direction and sliding speed, so that the intelligent robot can control the sliding direction and speed. For example, a massaging robot should be able to control the sliding speed and direction of its palm on the human body in a proper range.

Temperature and humidity sensing: when the limb of the intelligent robot approaches or touches an object, the intelligent robot should be able to sense the temperature of the external environment and the temperature of the object, so that the intelligent robot can protect its limb against high or low temperature and protect the served object against high or low temperature. For example, when a serving robot serves an elderly person or a patient with tea, the serving robot should determine whether the temperature of the tea is suitable for drinking by a human being; and, when the limb of the intelligent robot approaches flame or a high-temperature object, the intelligent robot should be able to actively avoid it. In addition, when the limb of the intelligent robot approaches or touches an object, the intelligent robot should be able to sense the humidity of the external environment and the humidity of the object. For example, when a household robot assists a human being in airing clothes, the household robot should be able to recognize whether the clothes have been dried.

In addition to the above basic functions, the intelligent touch sensors need to meet the requirements on miniaturization, low power consumption and convenient formation of a matrix of sensors since all limbs of the bionic robots need to be covered with a large area of bionic skin with a great number of touch sensors.

Depending upon the sensing principle, the existing technical research on intelligent touch sensors mainly focuses on resistive touch sensors, capacitive touch sensors, photoelectric touch sensors, piezoelectric touch sensors, inductive touch sensors, micro-electro-mechanical touch sensors and combined touch sensors (the combination of two or more of the above touch sensors). At present, most of the intelligent touch sensors are in the stage of laboratory research and are not mature enough to be widely applied. As research continues, more and more research teams focus on resistive, capacitive and resistive-capacitive combined touch sensors, which are already close to mature due to their simple manufacturing process, low cost and convenient mass production.

Pure resistive touch sensors are realized according to the principle that the resistivity of the flexible peizoresistance-variable material (e.g., conductive rubber) changes when subjected to a stress and thus reflects the magnitude of the stress. Pure resistive touch sensors have following advantages: a three-dimensional force, i.e. stress, can be sensed, the manufacturing process is simple, the cost is low, the anti-interference capability is high, and it is convenient for mass production. However, pure resistive touch sensors have following disadvantages: it is almost impossible to realize touch sensing, and it is impossible to classify and recognize the touched object; the approaching speed and distance cannot be determined when it is about to touch an object; the sensitivity is low; and it is difficult to control the homogeneity of products. The pure resistive touch sensors have certain market potential in some application fields with low requirements on touch sensing and sensitivity. The capacitive or resistive-capacitive combined touch sensors are the most promising at present. Compared with other types of touch sensors, the capacitive touch sensors have unique advantages in realizing touch sensing. In the capacitive touch sensors, based on the electric field theory, electric field lines can pass the approaching or touched object. Due to the characteristic that different objects have different dielectric constants, objects are classified and recognized. Particularly, it can be accurately determined whether an object is a human being or other objects. The capacitive touch sensors for realizing stress sensing and slide sensing also have advantages of high sensitivity, high consistency, easy manufacture, low cost, easy matrix formation and the like. However, the existing capacitive touch sensors still have some disadvantages.

Firstly, not all requirements of the touch sensors can be satisfied: touch sensing, including the classification and recognition of the object and the determination of the proximity of the object; touch sensing and slide sensing, i.e., the measurement of the magnitude and direction of the three-dimensional force; and, temperature sensing and humidity sensing.

Secondly, the anti-interference capability is poor, and it is easily affected by the environmental temperature, humidity and electromagnetic interference. During the measurement of the three-dimensional force, the influence from the environmental temperature and humidity are usually eliminated by a differential algorithm, and the anti-electromagnetic interference capability is improved by electromagnetic shielding. However, once the electromagnetic shielding is used, although the anti-electromagnetic interference capability is effectively improved, the capabilities of classifying and recognizing the object and determining the approaching speed and distance are lost, that is, touch sensing cannot be realized.

Thirdly, when a matrix of sensors is formed, the crosstalk between electric fields of adjacent sensor units cannot be avoided.

Recently, in numerous papers and patent documents issued by researchers in the world, touch sensors can be generally classified into two categories:

Sensors with only stress sensing and/or slide sensing, i.e., sensors that can only measure the three-dimensional force, where these touch sensors are subdivided into sensors with shielding and sensors without shielding. For example:

Patent Application CN201410245030 disclosed an all-flexible capacitive tactile sensor, wherein an upper polar plate of a parallel-plate capacitor is directly grounded as a shielding layer. Although the anti-interference capability is improved, the sensor has no functions of classifying and recognizing an object and determining the approaching degree since the electric field lines in the shielding layer cannot pass the shielding layer. As a result, touch sensing cannot be realized.

Patent Application US2008/0174321A1 disclosed a capacitive sensor capable of measuring the proximity of an object and slide sensing, wherein the sensor can operate in two modes. In this patent, capacitor electrodes are arranged in two layers. Two electrodes in the upper layer form a planar capacitor which can classify and recognize an object for touch sensing but cannot measure the approaching degree of the object for touch sensing. The electrodes in the upper layer and the electrodes in the lower layer can form parallel-plate capacitors which can measure the normal force for stress sensing, but cannot measure the tangential force.

Therefore, in this parent, any anti-interference measures such as shielding or differential algorithm cannot be realized. Any anti-crosstalk measures cannot be realized when a matrix is formed.

SUMMARY

An objective of the present application is to provide a sensor with a time-sharing regional shielding function in order to overcome the deficiencies in the prior art.

The present application provides a sensor with a time-sharing regional shielding function, wherein the sensor includes a plurality of sensor units, each of which includes regions contained in four multifunctional layers; a parallel-plate capacitor is contained in each of the multifunctional layers; and, the multifunctional layers are connected to a processer through analog switches, and the processor is connected to an external circuit;

the multifunctional layers regionally shield the sensor through the time-sharing switching of the analog switches and the control of a bus, where each measurement period T consists of two sub-periods T1 and T2:

in the T1, the first multifunctional layer is connected to an excitation signal for the multifunctional layer, the third multifunctional layer is connected to an analog-to-digital conversion circuit, and the second multifunctional layer and the fourth multifunctional layer are both grounded or the second multifunctional layer or the fourth multifunctional layer are both connected to excitation signals for common electrodes of the parallel-plate capacitors in the two multifunctional layers; and, analog switches that control the parallel-plate capacitors in the first multifunctional layer and the third multifunctional layer are turned off, and analog switches that control the parallel-plate capacitors in the second multifunctional layer and the fourth multifunctional layer are connected to excitation signals for common electrodes of the parallel-plate capacitors in the two multifunctional layers, so that the plane-like capacitor C1 formed by the first multifunctional layer and the third multifunctional layer is free from external crosstalk of the second multifunctional layer and the fourth multifunctional layer and free of crosstalk of the parallel-plate capacitors in the first multifunctional layer and the third multifunctional layer when realizing touch sensing, and the parallel-plate capacitors in the second multifunctional layer and the fourth multifunctional layer can still operate to measure the change in three-dimensional force when the second multifunctional layer and the fourth multifunctional layer are in a shielded state;

in the T2, the second multifunctional layer is connected to an excitation signal for the multifunctional layer, the fourth multifunctional layer is connected to an analog-to-digital conversion circuit, and the first multifunctional layer and the third multifunctional layer are both grounded or the first multifunctional layer or the third multifunctional layer are both connected to excitation signals for common electrodes of the parallel-plate capacitors in the two multifunctional layers; and, analog switches that control the parallel-plate capacitors in the second multifunctional layer and the fourth multifunctional layer are turned off, and analog switches that control the parallel-plate capacitors in the first multifunctional layer and the third multifunctional layer are connected to excitation signals for common electrodes of the parallel-plate capacitors in the two multifunctional layers, so that the plane-like capacitor C2 formed by the second multifunctional layer and the fourth multifunctional layer is free from external crosstalk of the first multifunctional layer and the third multifunctional layer and free of crosstalk of the parallel-plate capacitors in the second multifunctional layer and the fourth multifunctional layer when realizing touch sensing, and the parallel-plate capacitors in the first multifunctional layer and the third multifunctional layer can still operate to measure the change in three-dimensional force when the first multifunctional layer and the third multifunctional layer are in the shielded state; and in a next period T3, four multifunctional layers of a sensor unit in the shielded state are all grounded or connected to excitation signals for common electrodes of the parallel-plate capacitors in the four multifunctional layers, and the common electrodes of the parallel-plate capacitors in the four multifunctional layers are connected to corresponding excitation signals for the common electrodes, so that the sensor unit in the shielded state can measure the change in three-dimensional force, where T3=T.

The sensor with a time-sharing regional shielding function provided by the present application further includes the following auxiliary technical solutions.

The measurement period T is 1 ms to 20 ms, and T1=T2=0.5T.

Two layers of electrodes are arranged in each of the multifunctional layers, the upper layer including cross common electrodes, the lower layer including four separate electrodes corresponding to the cross common electrodes in the upper layer, and the cross common electrodes in the upper layer and the four separate electrodes in the lower layer forming four parallel-plate capacitors.

The region contained in each of the multifunctional layers includes an upper portion and a bottom portion corresponding to the multifunctional layer; the upper portion is made of a flexible conducting material, and a protective layer made of a flexible insulating material is arranged outside the flexible conducting material; the bottom portion includes multiple layers of PCB or FPC boards; a flexible insulating layer is arranged below the PCB or FPC boards, a ground-shielding layer controlled by an analog switch is arranged below the flexible insulating layer, and an insulating protective layer is arranged below the ground-shielding layer controlled by the analog switch; annular electrodes corresponding to the multifunctional layers are arranged on the PCB or FPC boards in the first layer, circular electrodes are arranged on the PCB or FPC boards in the second layer, and vias are formed on the circular electrodes; the annular electrodes and the circular electrodes are connected through the vias to form independent conducting regions; the upper portion is electrically connected to the bottom portion; the cross common electrodes in the upper layer are electrically connected to the PCB or FPC boards in the first layer through central conducting columns in the multifunctional layers; and, the separate electrodes in the lower layer are directly arranged on the PCB or FPC boards in the first layer.

The flexible conducting material is an organic conductive silver adhesive material, and a conductive silver adhesive bonding layer is arranged between the organic conductive silver adhesive material and the multifunctional layers.

The ground-shielding layer controlled by the analog switch is an organosilicone conductive silver adhesive shielding layer, and the insulating protective layer is a PDMS protective layer.

The upper portions and bottom portions of the multifunctional layers are bonded or crimped by a conductive adhesive to form electrical connections.

The conducting columns are electrically connected to the PCB or FPC boards in the first layer by welding, crimping or a conductive adhesive.

The first multifunctional layer and the third multifunctional layer are arranged at a same height and opposite to each other, and the second multifunctional layer and the fourth multifunctional layer are arranged at a same height and opposite to each other; the distance from the center of the first multifunctional layer to the center of the third multifunctional layer is d1, the distance from the center of the second multifunctional layer to the center of the fourth multifunctional layer is d2, and the ratio of d1 to d2 is 1.2 to 5; and, the height of the first multifunctional layer and the third multifunctional layer is h1, the height of the second multifunctional layer and the fourth multifunctional layer is h2, and the difference between h1 and h2 is 1 mm to 3 mm.

The present application further provides electronic skin, including the sensor with a time-sharing regional shielding function described above.

The present application further provides an intelligent robot, including the electronic skin described above.

The present application further provides an artificial prosthesis, including the electronic skin described above.

The implementations of the present application have the following technical effects.

In the sensor with a time-sharing regional shielding function provided by the present application, all functions of the touch sensor can be completely realized by the multifunctional layers. Firstly, the multifunctional layers themselves can form electrodes of plane-like capacitors to completely satisfy the requirements of touch sensing. Secondly, the multifunctional layers can act as electromagnetic shielding layers of a plurality of parallel-plate capacitors in the multifunctional layers, so that all functions of touch sensing can be realized while the anti-interference capability for three-dimensional force measurement is effectively improved. Thirdly, when a matrix of sensors is formed, the multifunctional layers can realize scanning while shielding regionally to effectively avoid the crosstalk between adjacent sensor units.

BRIEF DESCRIPTION OF THE DRAWINGS

FIG. 7 is a distribution view of electric field lines of multifunctional layers according to the present application;

FIG. 8 is a distribution view of electric field lines according to the present application when an external object is not within electric field line distribution regions of plane-like capacitors C1 and C2;

FIG. 9 is a distribution view of electric field lines according to the present application when an external object is within an electric field line distribution region of the plane-like capacitor C1 but not within an electric field line distribution region of the plane-like capacitor C2;

FIG. 10 is a distribution view of electric field lines according to the present application when an external object is within electric field line distribution regions of plane-like capacitors C1 and C2;

FIG. 11 is a distribution view of electric field lines according to the present application when an external object touches the plane-like capacitor C1 but does not touch the plane-like capacitor C2;

FIG. 12 is a distribution view of electric field lines according to the present application when an external object touches both the plane-like capacitors C1 and C2;

FIG. 13 is a matrix scanning view of a conventional sensor;

FIG. 14 is a matrix scanning view while shielding regionally according to the present application;

FIG. 15 is a sectional view of multifunctional regions according to an embodiment of the present application;

FIG. 16 is a structure diagram of parallel-plate capacitors according to an embodiment of the present application;

FIG. 17 is a schematic view of parallel-plate capacitors, with no force applied thereto, according to an embodiment of the present application;

FIG. 18 is a schematic view of parallel-plate capacitors subjected to a normal force according to an embodiment of the present application;

FIG. 19 is a schematic view of parallel-plate capacitors subjected to a tangential force according to an embodiment of the present application;

FIG. 20 is a schematic view of parallel-plate capacitors subjected to a sliding force according to an embodiment of the present application;

DETAILED DESCRIPTION

The present application will be described below in detail by embodiments with references to the accompanying drawings. It is to be noted that the embodiments to be described are merely provided for understanding the present application and not intended to limit the present application.

Figure 1:
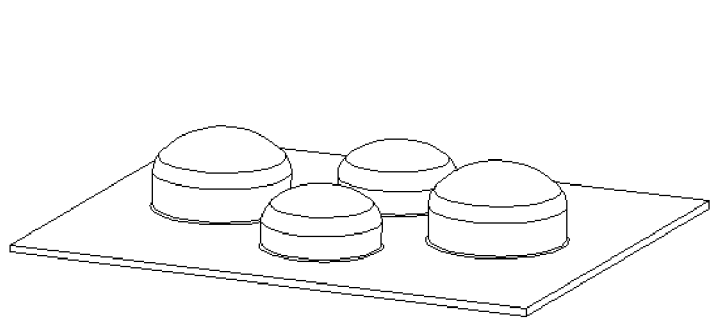
FIG. 1 is an external structure diagram of sensor units according to the present application.
Figure 2:
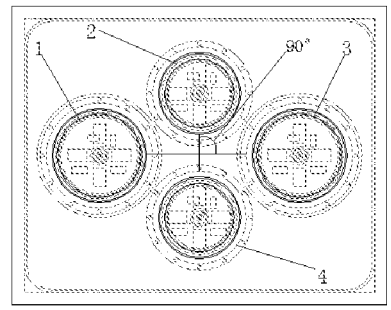
FIG. 2 is a layout view of multifunctional layers according to an implementation of the present application.
Figure 3:
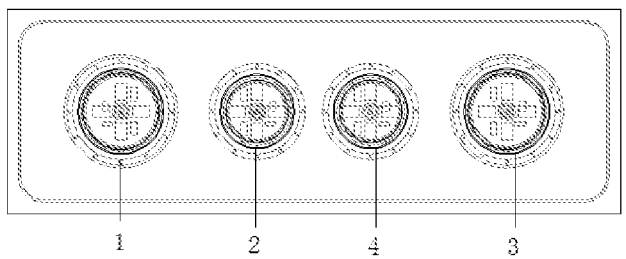
FIG. 3 is a layout view of multifunctional layers according to another implementation of the present application.
Figure 4:
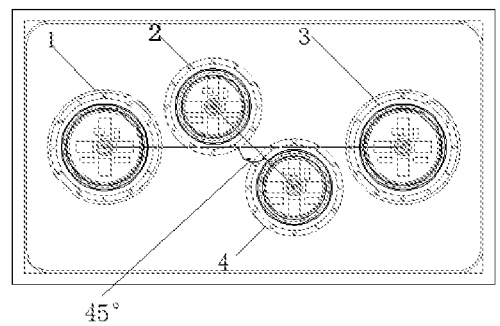
FIG. 4 is a layout view of multifunctional layers according to still another implementation of the present application.

As shown in FIG. 1, this embodiment provides a sensor with a time-sharing regional shielding function. The touch sensor includes a plurality of sensor units, each of which includes regions contained in four multifunctional layers. The four multifunctional layers are arranged in pairs and opposite to each other, and can be arranged at any angle by using the intersection of center connecting lines of the two pairs of multifunctional layers as a center. As shown in FIG. 2, the four multifunctional layers are arranged orthogonally, i.e., at 90 degrees. As shown in FIG. 3, the four multifunctional layers are arranged horizontally, i.e., at 0 degree. As shown in FIG. 4, the four multifunctional layers are arranged at 45 degrees.

Figure 5:
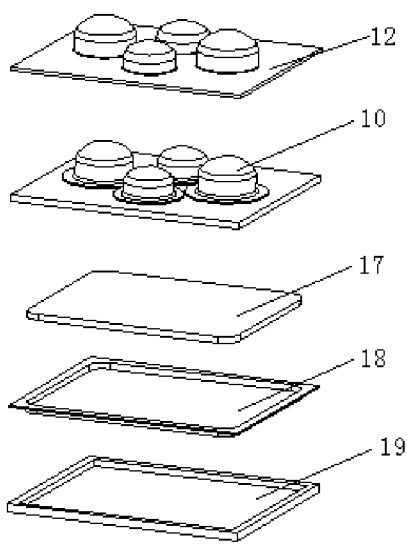
FIG. 5 is a layered view of sensor units according to the present application.
Figure 6:
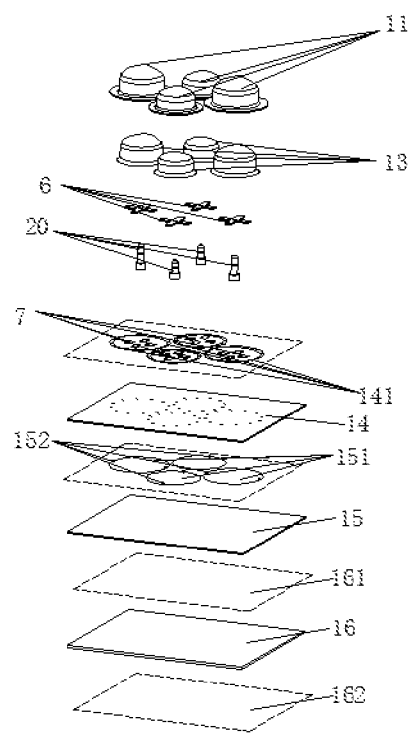
FIG. 6 is an exploded view of sensor units according to an embodiment of the present application.

As shown in FIGS. 5 and 6, the region contained in each of the multifunctional layers includes an upper portion 11 and a bottom portion corresponding to the multifunctional layer. The upper portion 11 is made of a flexible insulating material, and a protective layer 12 made of a flexible insulating material is arranged outside the flexible conducting material. The bottom portion includes multiple layers of PCB or FPC boards. A flexible insulating layer 17 is arranged below the PCB or FPC boards, a ground-shielding layer 18 controlled by an analog switch is arranged below the flexible insulating layer 17, and an insulating protective layer 19 is arranged below the ground-shielding layer 18 controlled by the analog switch. Annular electrodes 141 corresponding to the multifunctional layers are arranged on the PCB or FPC boards 14 in the first layer, circular electrodes 151 are arranged on the PCB or FPC boards 15 in the second layer, and vias 152 are formed on the circular electrodes 151. The vias 152 are used for connecting the annular electrodes 141 and the circular electrodes 151 to form independent conducting regions. The upper portions 11 made of the flexible conducting material and the PCB or FPC boards 15 in the second layer form complete multifunctional layers. Since the PCB or FPC boards in a single layer have a thickness of 0.025 mm, the requirements of using the multifunctional layers as shielding layers can be completely satisfied. Electronic devices of the touch sensor units are arranged on lower surfaces 162 of the PCB or FPC boards 16 in the third layer, and the upper surfaces 161 and lower surfaces 162 of the PCB or FPC boards 16 in the third layer are used for electronic circuit wiring. As shown in FIG. 6, a flexible insulating material 13 is filled in the region corresponding to each of the multifunctional layers, and the flexible insulating material 13 insulate the electrodes in upper and lower layers and the multifunctional layers from each other. Cross common electrodes 6 in the upper layer are electrically connected to the PCB or FPC boards in the first layer through central conducting columns 20 arranged in the multifunctional layers. Separate electrodes 7 in the lower layer are directly arranged on the PCB or FPC boards 141 in the first layer. The distance from the cross common electrodes in the upper layer to the separate electrodes in the lower layer is 0.5 mm to 3 mm.

Preferably, the sensor units each have a volume of 1 mm$^3$ to 100 mm$^3$.

Preferably, the ground-shielding layer 18 controlled by the analog switch is made of an organosilicone conductive silver adhesive material, and the insulating protective layer 19 is made of a PDMS material.

Preferably, the flexible conducting material is an organic conductive silver adhesive material, and the organic conductive silver adhesive material is bonded to the multifunctional layer through a conductive silver adhesive.

Preferably, the upper portions 11 and the bottom portions of the multifunctional layers are bonded or crimped by a conductive adhesive to form electrical connections; and, the conducting columns 20 are electrically connected to the PCB or FPC boards 141 in the first layer by welding, crimping or a conductive adhesive.

For ease of description, this embodiment will be described by taking the horizontal arrangement of the multifunctional layers as an example. As shown in FIG. 7, among the four multifunctional layers in this embodiment, the first multifunctional layer 1 and the third multifunctional layer 3 form a capacitor C1, and the second multifunctional layer 2 and the fourth multifunctional layer 4 form a capacitor C2, where the long dashed lines represent the electric field distribution of the capacitor C1 and the short dashed lines represent the electric field distribution of the capacitor C2. The first multifunctional layer 1 and the third multifunctional layer 3 are higher than the second multifunctional layer 2 and the fourth multifunctional layer 4, and the distance from the center of the first multifunctional layer 1 to the center of the third multifunctional layer 3 is greater than the distance from the center of the second multifunctional layer 2 to the center of the fourth multifunctional layer 4. With such an arrangement, an electric field line distribution region of the capacitor C1 is higher than an electric field line distribution region of the capacitor C2. As shown in FIG. 8, when an object 5 is not within the electric field line distribution regions of the capacitors C1 and C2, the medium in the electric field line distribution regions of both the capacitors C1 and C2 is air, and the capacitance of both the capacitors C1 and C2 will proportionally change with the change in environment temperature and humidity. This proportional change is characterized in that the influence from the change in environment temperature and humidity can be eliminated by a digital differential algorithm. As shown in FIG. 9, when the object 5 is within the electric field line distribution region of the capacitor C1 but is not within the electric field line distribution region of the capacitor C2, due to different dielectric constants of objects made of different materials, the capacitance of the capacitor C1 will change, and the change in capacitance of the capacitor C1 is approximately proportional to the dielectric constant of the object, and the capacitance of the capacitor C2 remains unchanged. As shown in FIG. 10, when the object 5 is within the electric field line distribution regions of both the capacitors C1 and C2, the change in capacitance of the capacitors C1 and C2 is proportional to the dielectric constant of the object, and the dielectric constant of the object and the approaching distance and speed can be calculated according to the relationship between the change of the capacitors C1 and C2 and the time, so that the functions of classifying and recognizing the object 5 and determining the proximity are realized.

It is to be noted that, in this embodiment, the bottom portions of the multifunctional layers arranged in the sensor units are arranged in a same plane, so the capacitors provided in this embodiment can be regarded as plane-like capacitors.

As shown in FIG. 11, when the object 5 just touches the higher first multifunctional layer 1 and third multifunctional layer 3 in the sensor unit but does not touch the lower second multifunctional layer 2 and fourth multifunctional layer 4, the detection units in the first multifunctional layer 1 and the third multifunctional layer 3 are stressed, and the detection units in the second multifunctional layer 2 and the fourth multifunctional layer 4 are not stressed and thus not changed. When the object 5 further applies a stress to the sensor unit, as shown in FIG. 12, the detection units in the second multifunctional layer 2 and the fourth multifunctional layer 4 are subjected to the stress and thus changed. Thus, the moment when the object is touched can be further determined accurately, and the speed at which the object touches the surface of the sensor can be calculated accurately. In the sensor with a time-sharing regional shielding function provided in this embodiment, when a plurality of touch sensor units form a matrix of sensors (applied to the intelligent bionic skin), the function of matrix scanning of the sensor while shielding regionally can be realized by the synchronous control by the analog switches and the bus, so that the crosstalk between adjacent sensor units is avoided during the matrix scanning.

The capacitive matrix scanning in the prior art is shown in FIG. 13, where row scanning lines are connected to excitation signals through multiple switches and column scanning lines are connected to a capacitance input measurement channel through multiple switches. When a certain row and a certain column (e.g., the second row and the second column) are selected, the excitation signal in the selected row is simultaneously applied to excitation electrodes for capacitors in all columns, and only the capacitance input stage in the selected column is connected to the capacitance measurement channel. However, at this time, excitation electrodes for capacitors in adjacent unselected columns in the selected row will cause crosstalk to the selected capacitor. In addition, excitation signals on connecting lines in the selected row will cause crosstalk to the selected capacitor.

The scanning while shielding regionally in this embodiment is shown in FIG. 14. An SPI bus selects, by an address bit, a sensor unit in a measurement state and marks this sensor unit as O; and sensor units, for which no address bit is assigned, are marked as X for ground-shielding and thus will not cause crosstalk to the selected sensor unit. In the selected sensor unit, its four multifunctional layers form two plane-like capacitors used to realize touch sensing, and the excitation signal comes from this sensor unit. When a sensor unit is used as a ground-shielded unit, its four multifunctional layers in this sensor unit are all grounded, and the size of the shielded region (i.e., the number of the ground-shielded units) can be determined according to actual needs. When a sensor unit is used as a ground-shielded unit, the multifunctional layers in this sensor unit temporarily lose their touch sensing function, but the unit for measuring a three-dimensional force in each of the multifunctional layers still operates normally to ensure the stress sensing and slide sensing functions. Since the four multifunctional layers in an unselected sensor unit are all grounded, no crosstalk will be caused to the selected adjacent units.

Embodiment 1

In this embodiment, the detection units for detecting a three-dimensional force in the multifunctional layers are parallel-plate capacitors.

The parallel-plate capacitors in the four multifunctional layers in each sensor unit are the same in structure. To simplify the description, the description will be given by taking the internal structure of only the first multifunctional layer 1 as an example.

As shown in FIGS. 15, 16, 21 and 22, four parallel-plate capacitors C3, C4, C5 and C6 are formed by the cross common electrodes 6 in the upper layer of the first multifunctional layer 1 and the four corresponding rectangular separate electrodes 7 in the lower layer, respectively; four parallel-plate capacitors C7, C8, C9 and C10 are formed by the cross common electrodes 6 in the upper layer of the second multifunctional layer 2 and the four corresponding rectangular separate electrodes 7 in the lower layer, respectively; four parallel-plate capacitors C11, C12, C13 and C14 are formed by the cross common electrodes 6 in the upper layer of the third multifunctional layer 3 and the four corresponding rectangular separate electrodes 7 in the lower layer, respectively; and, four parallel-plate capacitors C15, C16, C17 and C18 are formed by the cross common electrodes 6 in the upper layer of the fourth multifunctional layer 4 and the four corresponding rectangular separate electrodes 7 in the lower layer, respectively, where the common electrodes 6 are connected to excitation signals, and the rectangular electrodes 7 are connected to four capacitance analog-to-digital conversion channels, respectively.

For ease of description, the description will be given by taking only parallel-plate capacitors C4 and C5 formed by the cross common electrodes 6 in the upper layer and the rectangular electrodes 7 in the lower layer as an example.

As shown in FIG. 17, when no external force is applied, the distance between two polar plates of the parallel-plate capacitor C4 is a1, and the facing area between the two polar plate is s1; and, the distance between two polar plates of the parallel-plate capacitor C5 is a2, and the facing area between the two polar plates is s2, where a1=a2 and s1=s2. Therefore, the parallel-plate capacitor C4 and the parallel-plate capacitor C5 have equal capacitance. When a normal force from the object 5 is applied, as shown in FIG. 18, both the distance a1 between two polar plates of the parallel-plate capacitor C4 and the distance a2 between two polar plates of the parallel-plate capacitor C5 change, so that both the capacitance of the parallel-plate capacitor C4 and the capacitance of the parallel-plate capacitor C5 change. Thus, the magnitude and direction of the applied normal force can be measured. When a tangential force from the object 5 is applied, as shown in FIG. 19, the facing area s1 between two polar plates of the parallel-plate capacitor C4 and the facing area s2 between two polar plates of the parallel-plate capacitor C5 change, so that both the capacitance of the parallel-plate capacitor C4 and the capacitance of the parallel-plate capacitor C5 change. Thus, the magnitude of the applied tangential force can be measured. Moreover, the direction of the applied tangential force can be determined according to different changes in capacitance of the parallel-plate capacitor C4 and the parallel-plate capacitor C5. Specifically, when a tangential force in the direction shown by the arrow in FIG. 19 is applied, the absolute value of the change in capacitance of the parallel-plate capacitor C4 is greater than the absolute value of the change in capacitance of the parallel-plate capacitor C5. When a tangential force in a direction opposite to the direction shown by the arrow in FIG. 19 is applied, the absolute value of the change in capacitance of the parallel-plate capacitor C4 is less than the absolute value of the change in capacitance of the parallel-plate capacitor C5. Thus, the direction of the tangential force applied on the sensor can be determined according to different changes in capacitance of the parallel-plate capacitor C4 and the parallel-plate capacitor C5 in this embodiment. When a sliding force is applied, as shown in FIG. 20, the normal force and tangential force applied on the parallel-plate capacitor C4 and the parallel-plate capacitor C5 vibrate, so that the distance a1 between two polar plates of the parallel-plate capacitor C4 and the distance a2 between two polar plates of the parallel-plate capacitor C5 as well as the facing area s1 between two polar plates of the parallel-plate capacitor C4 and the facing area s2 between two polar plates of the parallel-plate capacitor C5 all change, resulting in the fluctuation of the capacitance of the parallel-plate capacitor C4 and the capacitance of the parallel-plate capacitor C5. Thus, the sliding speed and direction can be measured.

In this embodiment, the multifunctional layers cover the cross common electrodes in the upper layer and the separate electrodes in the lower layer, and the multifunctional layers are groove-shaped. The multifunctional layers may be hemispherical, elliptic or the like.

The multifunctional layers are used for electromagnetically shielding the parallel-plate capacitors in the multifunctional layers. The electromagnetic shielding is realized in two ways, i.e., ground-shielding and equipotential shielding.

The multifunctional layers can be grounded by switching the analog switches for the multifunctional layers to a grounded position, to realize the ground-shielding of external electromagnetic signals. The multifunctional layers and the common electrodes of the parallel-plate capacitors become equipotential by switching the analog switches for the multifunctional layers to be connected to corresponding excitation signals for the common electrodes for the parallel-plate capacitors, to realize the equipotential shielding of external electromagnetic signals.

Specifically, in this embodiment, the multifunctional layers are connected to a processor through analog switches, and the processor is connected to an external circuit through a bus.

Figure 21A:
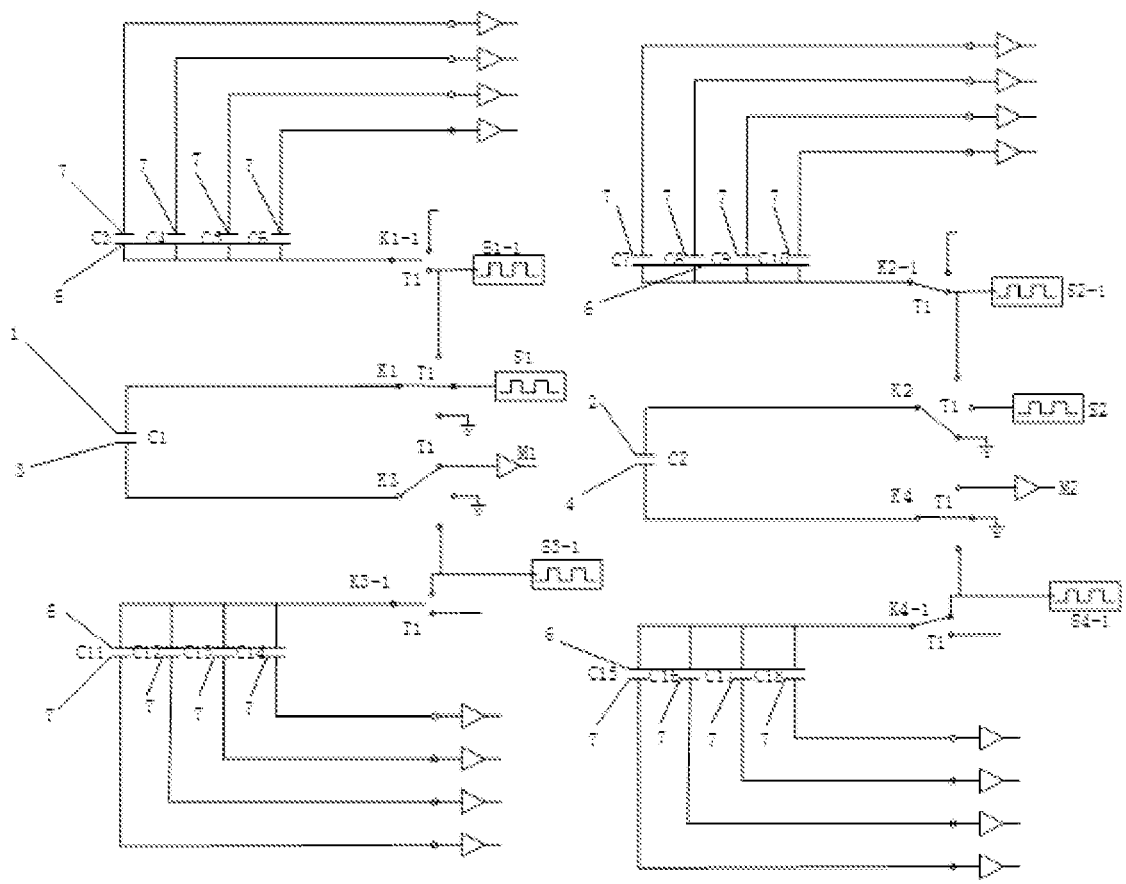
FIG. 21a, FIG. 21a', FIG. 21b, and FIG. 21b' are a circuit control diagram according to an embodiment of the present application.
Figure 21B:
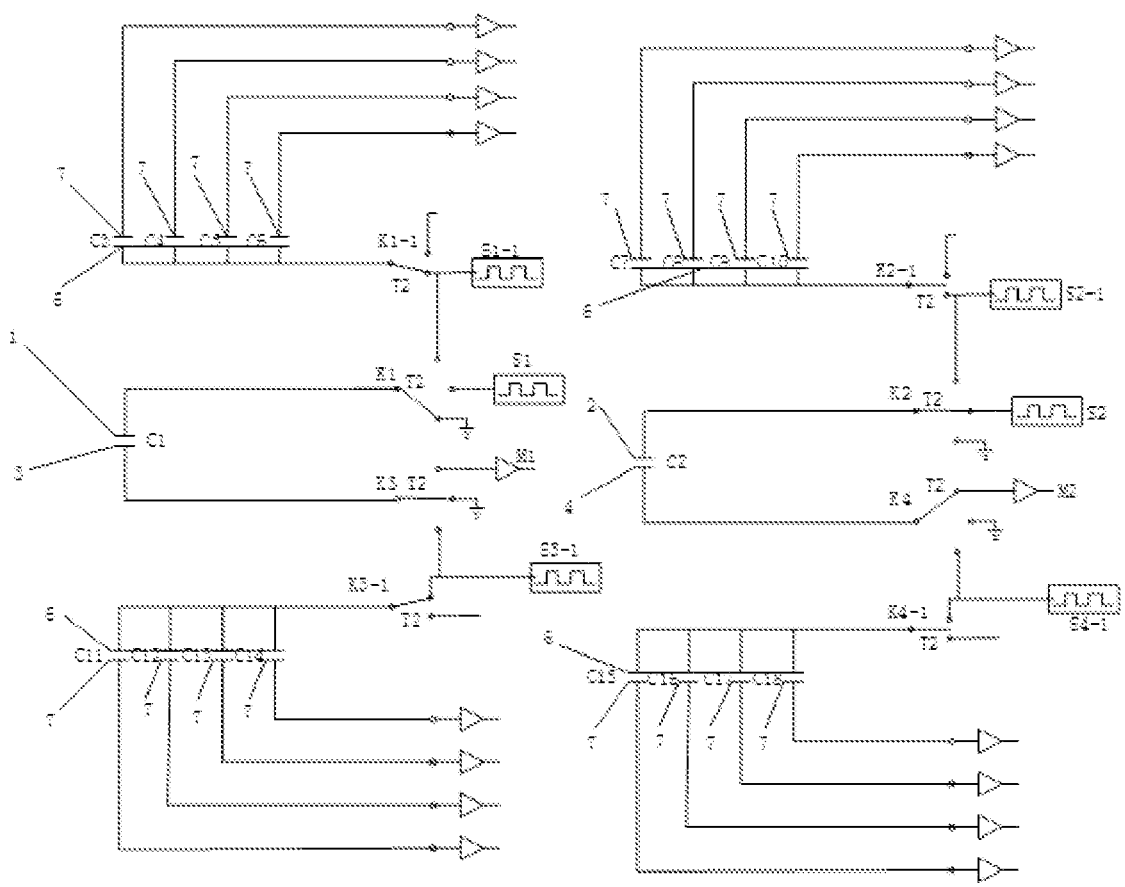
Figure 22A:
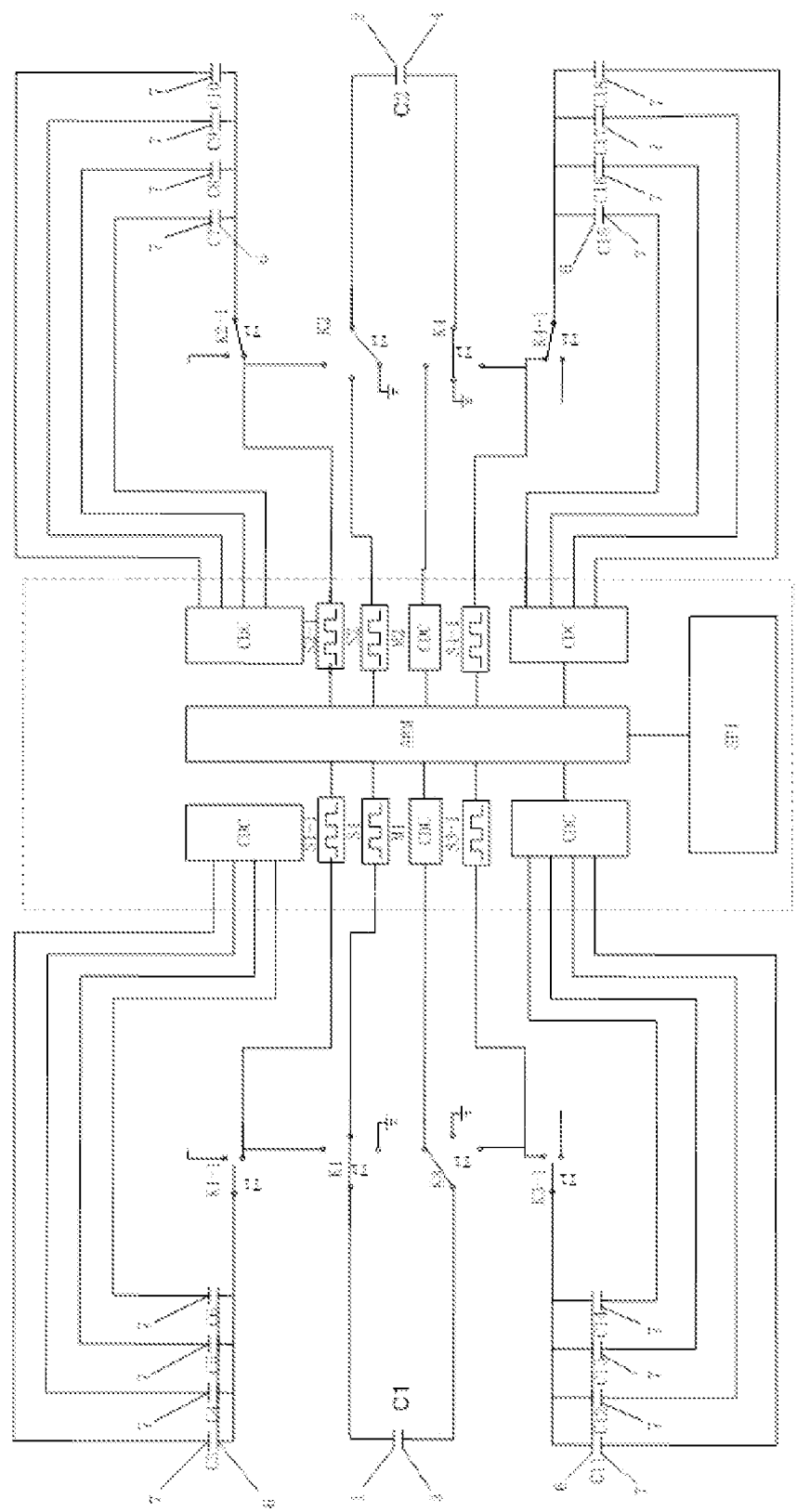
FIG. 22a, FIG. 22a', FIG. 22b, and FIG. 22b' are an equivalent circuit diagram of sensor units according to an embodiment of the present application.
Figure 22A:
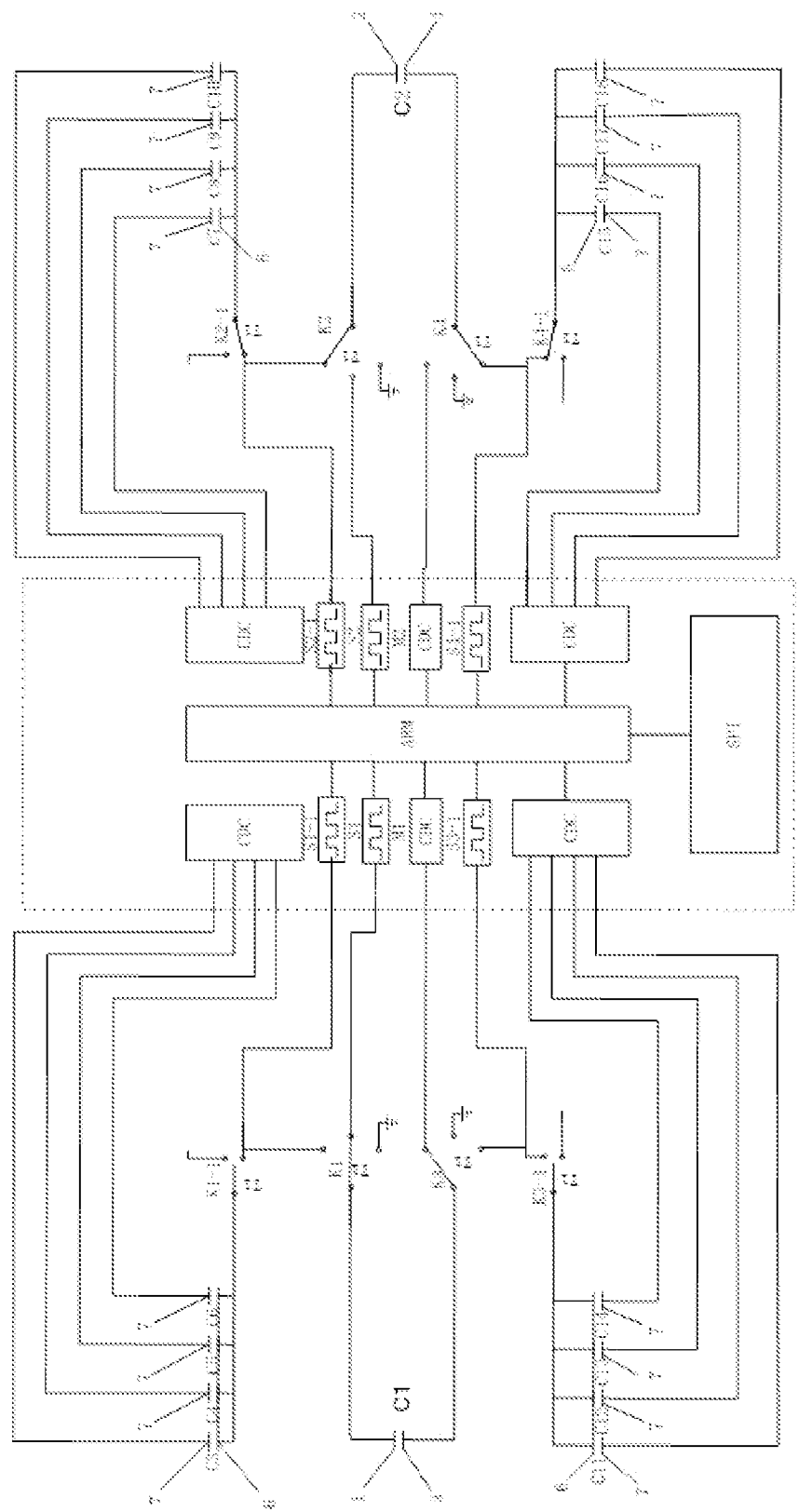
Figure 22B:
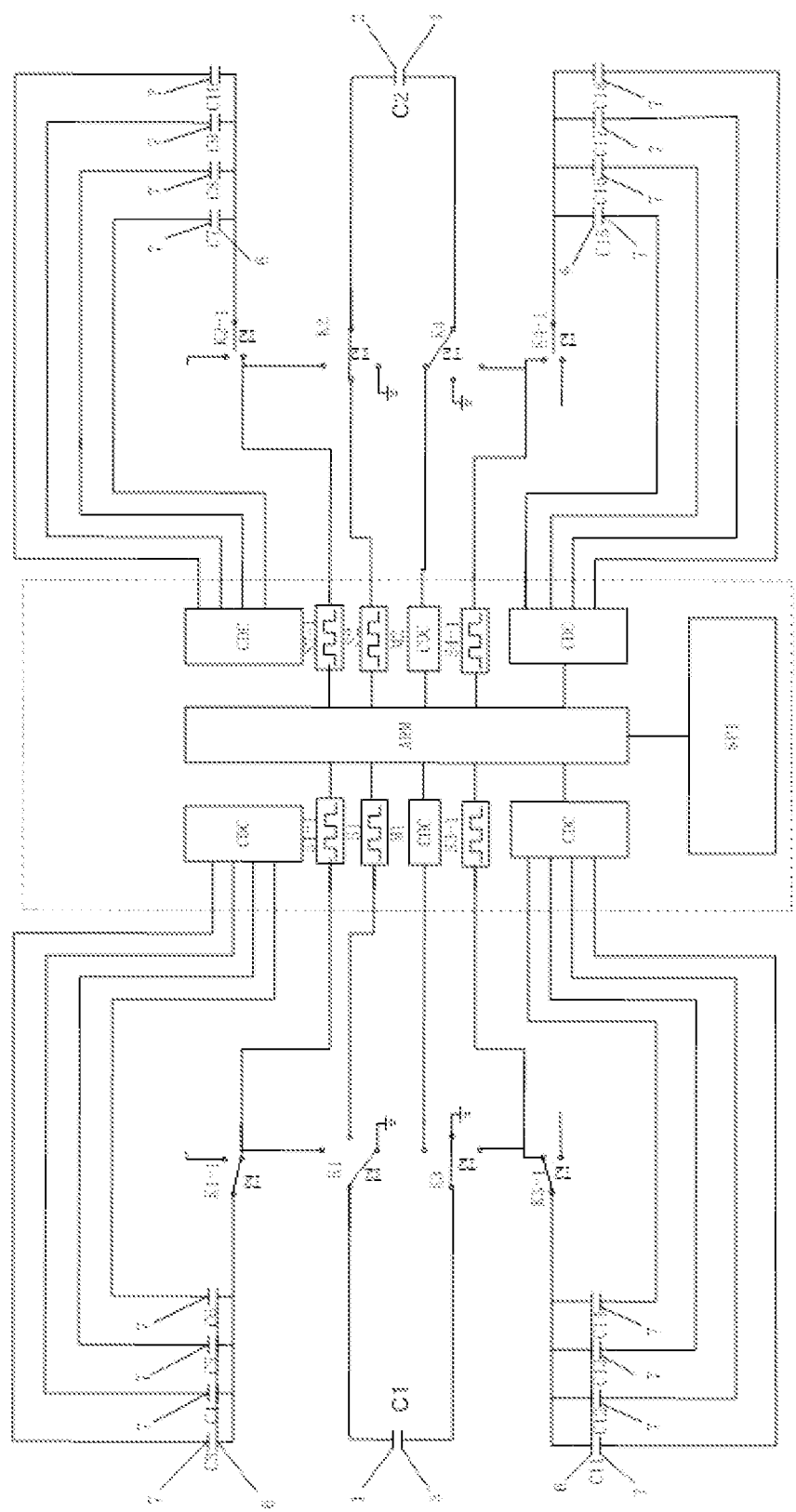
Figure 22B:
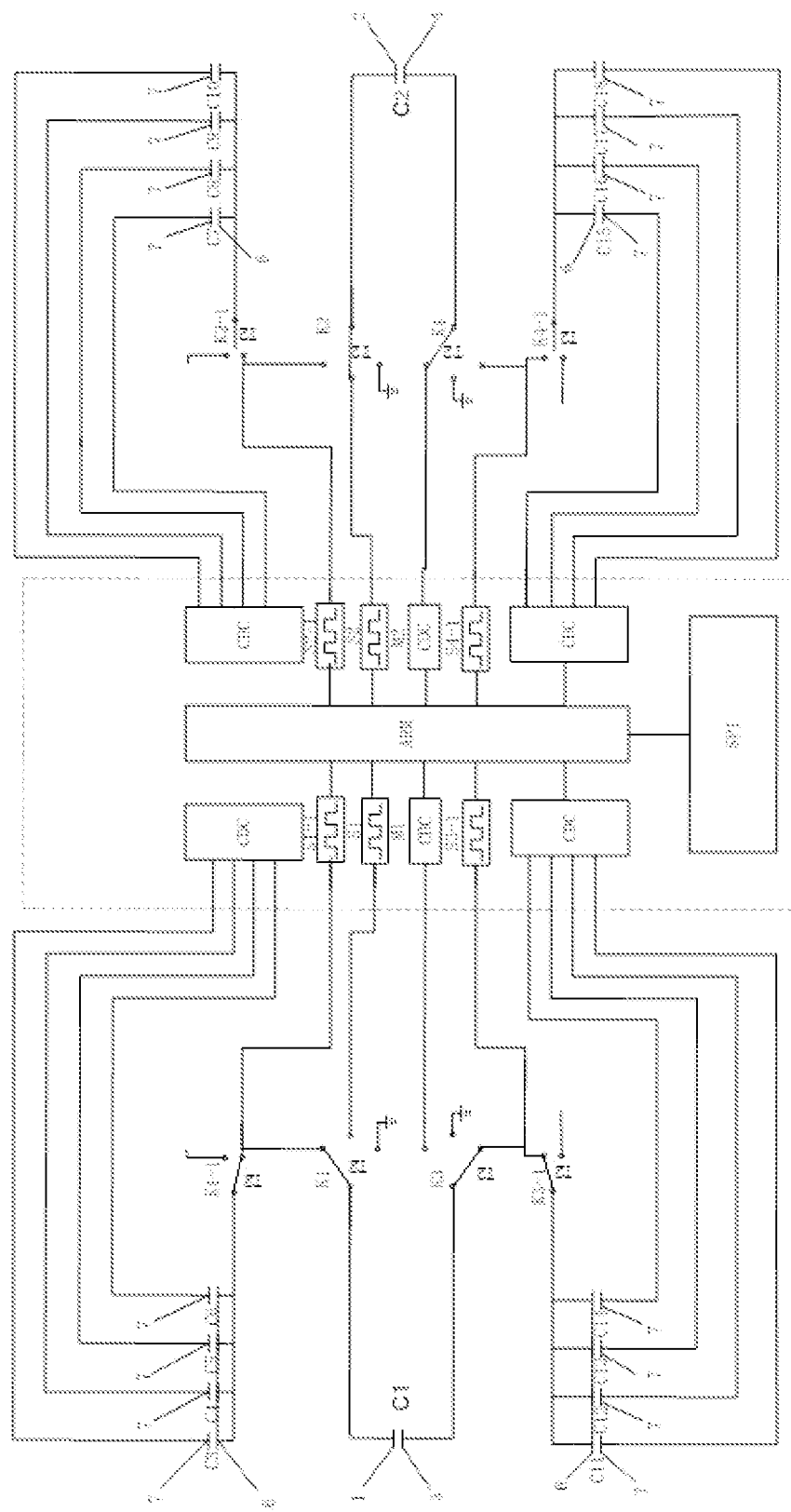
Figure 23:
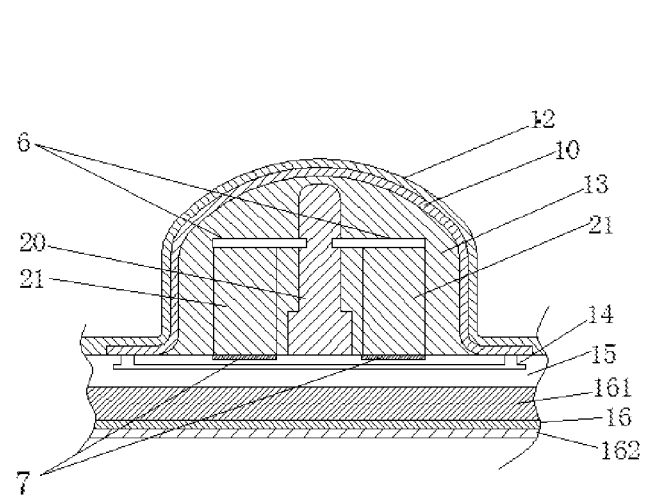
FIG. 23 is a sectional view of multifunctional layers according to another embodiment of the present application.
Figure 24:
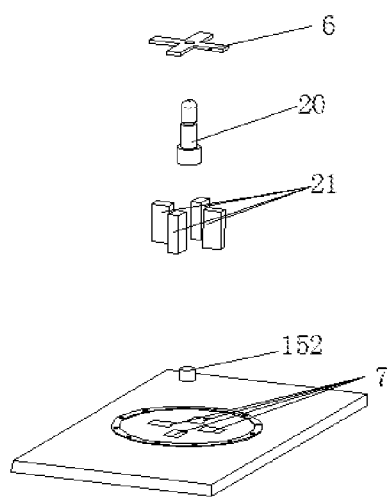
FIG. 24 is a partially exploded view of FIG. 23.

The multifunctional layers regionally shield the functions of the sensor through the time-sharing switching of the analog switches and the control of the bus. During the regional scanning:

As shown in FIG. 21, a sensor unit in a scanning state executes operations in the period T as follows, where one measurement period T consists of two sub-periods T1 and T2.

In T1, the analog switch K1 for the first multifunctional layer 1 is connected to an excitation signal S1 for the multifunctional layer; the analog switch K3 for the third multifunctional layer 3 is connected to an analog-to-digital conversion circuit M1; and the analog switch K2 for the second multifunctional layer 2 and the analog switch K4 for the fourth multifunctional layer 4 are both grounded, or, the analog switch K2 for the second multifunctional layer 2 is connected to an excitation signal S2-1 for the common electrode 6 of the parallel-plate capacitor in this multifunctional layer and the analog switch K4 for the fourth multifunctional layer 4 is connected to an excitation signal S4-1 for the common electrode 6 of the parallel-plate capacitor in this multifunctional layer. The analog switch K1-1 for the parallel-plate capacitor in the first multifunctional layer 1 and the analog switch K3-1 for the parallel-plate capacitor in the third multifunctional layer 3 are both turned off, so that the plane-like capacitor C1 is free of external crosstalk from the second multifunctional layer 2 and the fourth multifunctional layer 4 and free of crosstalk from the parallel-plate capacitors in the first multifunctional layer 1 and the third multifunctional layer 3 when realizing touch sensing. Meanwhile, the analog switch K2-1 that controls the parallel-plate capacitor in the second multifunctional layer 2 is connected to an excitation signal S2-1 for the common electrode 6 of the parallel-plate capacitor in this multifunctional layer, and the analog switch K4-1 that controls the parallel-plate capacitor in the fourth multifunctional layer 4 is connected to an excitation signal S4-1 for the common electrode 6 of the parallel-plate capacitor in this multifunctional layer, so that the parallel-plate capacitors in the second multifunctional layer 2 and the fourth multifunctional layer 4 can still operate to measure the change in three-dimensional force when the second multifunctional layer 2 an the fourth multifunctional layer 4 are in the shielded state.

In T2, the analog switch K2 for the second multifunctional layer 2 is connected to an excitation signal S2 for the multifunctional layer; the analog switch K4 for the fourth multifunctional layer 4 is connected to an analog-to-digital conversion circuit M2; and the analog switch K1 for the first multifunctional layer 1 and the analog switch K3 for the third multifunctional layer 3 are both grounded, or, the analog switch K1 for the first multifunctional layer 1 is connected to an excitation signal S1-1 for the common electrode 6 of the parallel-plate capacitor in this multifunctional layer and the analog switch K3 for the third multifunctional layer 3 is connected to an excitation signal S3-1 for the common electrode 6 of the parallel-plate capacitor in this multifunctional layer. The analog switch K2-1 for the parallel-plate capacitor in the second multifunctional layer and the analog switch K4-1 for the parallel-plate capacitor in the fourth multifunctional layer are both turned off, so that the plane-like capacitor C2 is free of external crosstalk from the first multifunctional layer 1 and the third multifunctional layer 3 and free of crosstalk from the parallel-plate capacitors in the second multifunctional layer 2 and the fourth multifunctional layer 4 when realizing touch sensing. Meanwhile, the analog switch K1-1 that controls the parallel-plate capacitor in the first multifunctional layer 1 is connected to an excitation signal S1-1 for the common electrode 6 of the parallel-plate capacitor in this multifunctional layer, and the analog switch K3-1 that controls the parallel-plate capacitor in the third multifunctional layer 3 is connected to an excitation signal S3-1 for the common electrode 6 of the parallel-plate capacitor in this multifunctional layer, so that the parallel-plate capacitors in the first multifunctional layer 1 and the third multifunctional layer 3 can still operate to measure the change in three-dimensional force when the first multifunctional layer 1 and the third multifunctional layer 3 are in the shielded state.

A sensor unit in the shielded state executes operations in the period T3 as follows, where T3=T.

In T3, the analog switches K1, K2, K3 and K4 for the four multifunctional layers of the sensor unit in the shielded state are all grounded, or the analog switches K1, K2, K3 and K4 for the four multifunctional layers are connected to excitation signals S1-1, S2-1, S3-1 and S4-1 for common electrodes 6 of the parallel-plate capacitors in the four multifunctional layers, and the analog switches K1-1, K2-1, K3-1 and K4-1 that control the common electrodes of the parallel-plate capacitors in the four multifunctional layers are connected to corresponding excitation signals S1-1, S2-1, S3-1 and S4-1 for the common electrodes 6 of the parallel-plate capacitors, so that the sensor unit in the shielded state can measure the change in three-dimensional force.

As shown in FIG. 22, in this embodiment, the capacitance is measured by the 7150 chip from the adl Company, the processor is a 32-bit process with an ARM-m0 core, and the external communication is realized by an SPI bus.

Preferably, the measurement period T is 1 ms to 20 ms, and T1=T2=0.5T.

Figure 25:
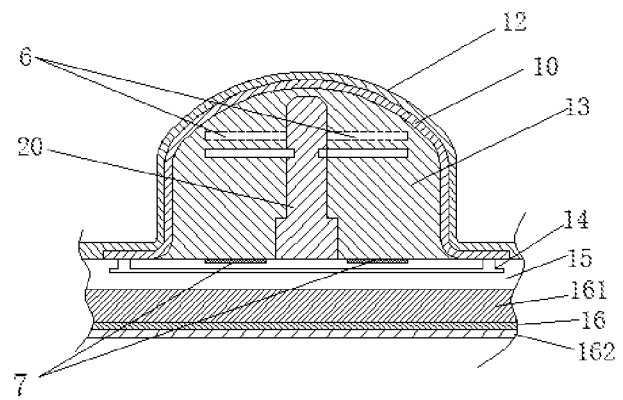
FIG. 25 is a schematic view of a piezoresistor expanded due to heat according to an embodiment of the present application.
Figure 26:
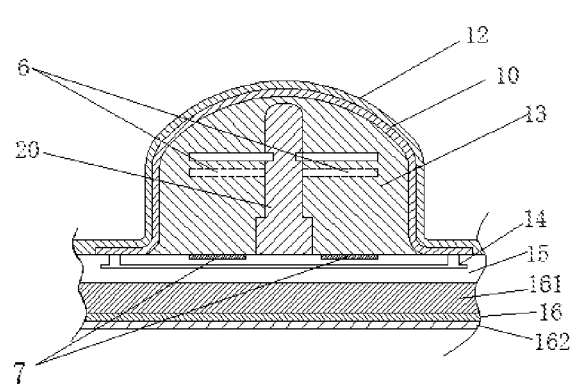
FIG. 26 is a schematic view of a piezoresistor contracted in cold according to an embodiment of the present application.

Preferably, temperature sensing can be realized by combining the multifunctional layers and the parallel-plate capacitors. Actually, the temperature can be directly measured by the parallel-plate capacitors used for measuring the three-dimensional force. The change in ambient temperature can lead to the expansion or contraction of the medium between the parallel-plate capacitors and thus change the distance between the parallel-plate capacitors, resulting in the change in capacitance. However, due to the absence of multifunctional layers, the existing touch sensors cannot distinguish whether the change in capacitance is caused by the stress from the object or by the change in temperature. As a result, the temperature sensing function of the touch sensors cannot be realized directly by parallel-plate capacitors. In this embodiment, by the multifunctional layers, it can be accurately determined whether an object touches the touch sensor. In a case where no object touches the touch sensor, due to the electromagnetic shielding effects of the multifunctional layers, the temperature is only one factor that results in the change of the parallel-plate capacitors. As shown FIGS. 8 and 25, when the ambient temperature rises, the flexible insulating material between the parallel-plate capacitors will be expanded, so that the distance between the parallel-plate capacitors increases and the capacitance of the four parallel-plate capacitors decreases proportionally. Conversely, as shown in FIG. 26, when the ambient temperature falls, the flexible insulating material between the parallel-plate capacitors will be contracted, so that the distance between the parallel-plate capacitors decreases and the capacitance of the four parallel-plate capacitors increases proportionally. Thus, the change in temperature can be calculated according to the change in capacitance.

As shown in FIG. 11, when an object 5 touches the touch sensor, due to the difference in height of the two pairs of multifunctional layers, the higher first multifunctional layer 1 and third multifunctional layer 3 are stressed, but the lower second multifunctional layer 2 and fourth multifunctional layer 4 are not stressed. As shown in FIG. 25, if the temperature of the object 5 is higher than the ambient temperature, due to the heat conduction, the flexible insulating material between polar plates of the parallel-plate capacitors in the second multifunctional layer 2 and fourth multifunctional layer 4 that are not stressed are expanded due to heat, so that the capacitance thereof decreases proportionally. Conversely, as shown in FIG. 26, if the temperature of the object 5 is lower than the ambient temperature, due to the heat conduction, the flexible insulating material between polar plates of the parallel-plate capacitor in the second multifunctional layer and fourth multifunctional layer that are not stressed will be contracted, so that the capacitance thereof increases proportionally. Thus, the temperature of the object that touches the touch sensor can be calculated according to the change in capacitance of the parallel-plate capacitors in the second multifunctional layer 2 and the fourth multifunctional layer.

Preferably, the parallel-plate capacitors have a measurement range of 0.001 pf to 100 pf.

Preferably, the distance from the center of the first multifunctional layer 1 to the center of the third multifunctional layer 3 is d1, the distance from the center of the second multifunctional layer 2 to the center of the fourth multifunctional layer 4 is d2, and the ratio of d1 to d2 is 1.2 to 5; and, the height of the first multifunctional layer 1 and the third multifunctional layer 3 is h1, the height of the second multifunctional layer 2 and the fourth multifunctional layer 4 is h2, and the difference between h1 and h2 is 1 mm to 3 mm.

Embodiment 2

In this embodiment, the detection units for detecting a three-dimensional force in the multifunctional layers are piezoresistors.

As shown in FIGS. 23-26, the structures and functions of the multifunctional layers are the same as those of the multifunctional layers in Embodiment 1. However, the parallel-plate capacitors for measuring the three-dimensional force in the multifunctional layers are replaced with piezoresistors. The electrode structures in the multifunctional layers remain unchanged, except that four rectangular flexible piezoresistors 21 are additionally provided between the cross common electrodes 6 in the upper layer and the rectangular separate electrodes 7 in the lower layer. The cross common electrodes 6 in the upper layer and the four rectangular separate electrodes in the lower layer are used as two poles of the piezoresistors 21. When a normal force is applied, the four piezoresistors 21 are subjected to a same deformation stress. When a tangential force or a sliding force is applied, the piezoresistors 21 are subjected to different deformation stresses. Thus, the change in three-dimensional force can be measured according to the change of the four resistors.

In this embodiment, the multifunctional layers cover the cross common electrodes in the upper layer, the piezoresistors and the separate electrodes in the lower layer, and the multifunctional layers are groove-shaped. The multifunctional layers may be hemispherical, elliptic or the like.

Preferably, temperature sensing can be realized by combining the multifunctional layers and the piezoresistors 21. When the temperature changes, the four piezoresistors for measuring the three-dimensional force in the multifunctional layers will change in resistance due to the change in temperature, so that temperature sensing can be realized. The measurement principle is similar to the principle of measuring temperature by parallel-plate capacitors and will not be repeated here. Specifically, the piezoresistors 21 are made of a conducting rubber piezoresistive material. The force-sensitive conducting rubber piezoresistive material is a high-molecular material obtained by uniformly distributing carbon or other highly conducting particles into an insulating flexible polymer substrate material by particular processes. The conductivity of the piezoresistive material depends on the density of the conducting particles in the piezoresistive material. When the piezoresistive material is deformed due to a stress, the density of conducting particles in the piezoresistive material will change, so that the resistance at two ends of the sensor changes. Thus, the change in three-dimensional force in the multifunctional layers can be measured according to the change in resistance.

Figure 27A:
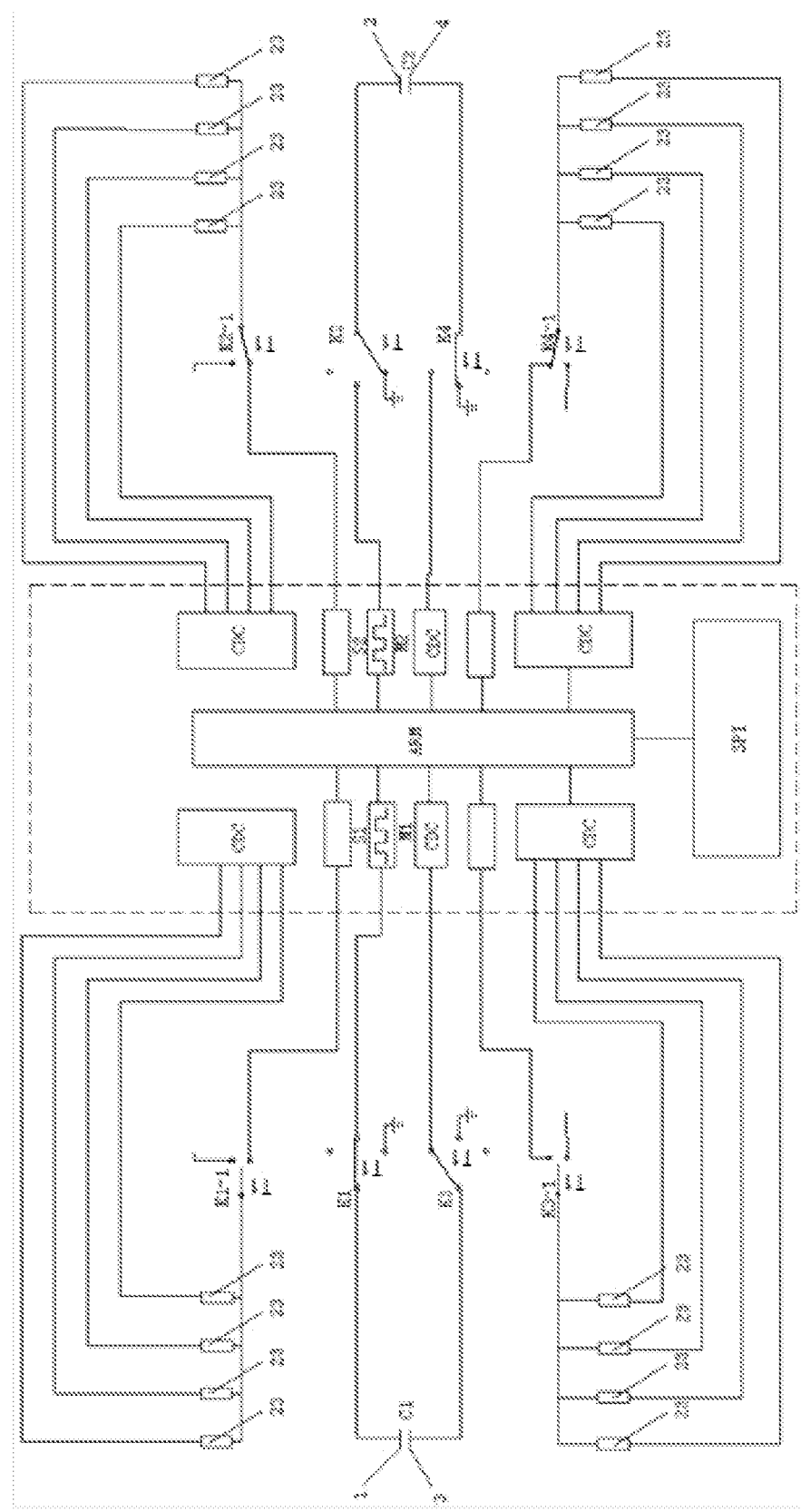
FIG. 27a and FIG. 27b are an equivalent circuit diagram of sensor units according to another embodiment of the present application.
Figure 27B:
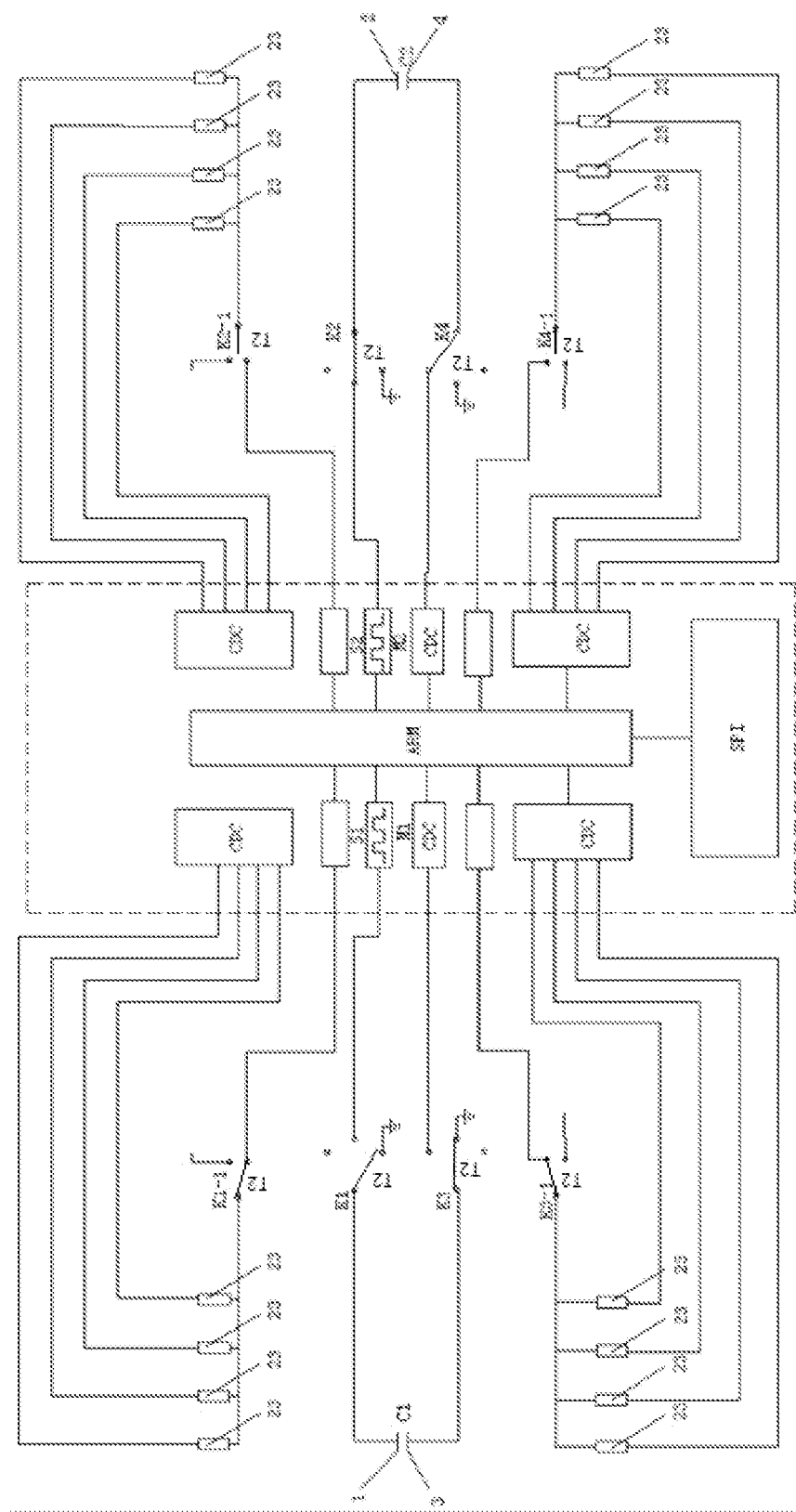

As shown in FIG. 27, the multifunctional layers are connected to a processor through analog switches, and the processor is connected to an external circuit through a bus. The functions of the multifunctional layers controlled by the analog switches and the piezoresistors in the multifunctional layers are switched periodically in a time-sharing manner. One measurement period T consists of two sub-periods T1 and T2.

In T1, the analog switch K1 for the first multifunctional layer 1 connects the first multifunctional layer 1 to an excitation signal S1 for the multifunctional layer, and the analog switch K3 for the third multifunctional layer 3 connects the third multifunctional layer 3 to a capacitive analog-to-digital conversion circuit m1, so that the first multifunctional layer 1 and the third multifunctional layer 3 form a plane-like capacitor C1. The analog switch K2 for the second multifunctional layer 2 and the analog switch K4 for the fourth multifunctional layer 4 are both grounded. The analog switch K1-1 that controls the piezoresistor 21 in the first multifunctional layer 1 and the analog switch K3-1 that controls the piezoresistor 21 in the third multifunctional layer 3 are both turned on, so that the plane-like capacitor C1 is free of external crosstalk from the second multifunctional layer 2 and the fourth multifunctional layer 4 and free of crosstalk from the first multifunctional layer 1 and the third multifunctional layer 3 when realizing touch sensing. Meanwhile, the analog switch K2-1 that controls the piezoresistor 21 in the second multifunctional layer 2 and the analog switch K4-1 that controls the piezoresistor 21 in the fourth multifunctional layer 4 are connected to the common electrodes 6 of the piezoresistors 21 in the two multifunctional layers, so that the piezoresistors 21 in the second multifunctional layer 2 and the fourth multifunctional layer 4 can still operate to measure the change in three-dimensional force when the second multifunctional layer 2 and the fourth multifunctional layer 4 are in the shielded state.

In T2, the analog switch K2 for the second multifunctional layer 2 connects the second multifunctional layer 2 to an excitation signal S2 for the multifunctional layer, and the analog switch K4 for the fourth multifunctional layer 4 connects the fourth multifunctional layer 4 to a capacitive analog-to-digital conversion circuit m2, so that the second multifunctional layer 2 and the fourth multifunctional layer 4 form a plane-like capacitor C2. The analog switch K1 for the first multifunctional layer 1 and the analog switch K3 for the third multifunctional layer 3 are both grounded. The analog switch K2-1 that controls the piezoresistor 21 in the second multifunctional layer 2 and the analog switch K4-1 that controls the piezoresistor 21 in the fourth multifunctional layer 4 are both turned on, so that the plane-like capacitor C2 is free of external crosstalk from the first multifunctional layer 1 and the third multifunctional layer 3 and free of crosstalk from the second multifunctional layer 2 and the fourth multifunctional layer 4 when realizing touch sensing. Meanwhile, the analog switch K1-1 that controls the piezoresistor 21 in the first multifunctional layer 1 and the analog switch K3-1 that controls the piezoresistor 21 in the third multifunctional layer 3 are connected to the common electrodes 6 of the piezoresistors 21 in the two multifunctional layers, so that the piezoresistors 21 in the first multifunctional layer 1 and the third multifunctional layer 3 can still operate to measure the change in three-dimensional force when the first multifunctional layer 1 and the third multifunctional layer 3 are in the shielded state.

The measurement period T should be controlled to be 1 ms to 20 ms, and $T1=T2=1/2T$.

During the regional matrix scanning, a selected sensor unit in a measurement state executes the period T, and a sensor unit selected as a shielded region executes a special period T3.

Analog switches K1, K2, K3 and K4 for four multifunctional layers of a sensor unit in the shielded state are all grounded, and analog switches K1-1, K2-1, K3-1 and K4-1 that control piezoresistors 21 in the four multifunctional layers are connected to cross common electrodes 6 of the piezoresistors 21 in the four multifunctional layers, so that the sensor unit in the shielded state can measure the change in three-dimensional force.

As shown in FIG. 27, in this embodiment, the capacitance is measured by the 7150 chip from the adl Company, the processor is a 32-bit process with an ARM-m0 core, and the external communication is realized by an SPI bus.

Preferably, the measurement period T is 1 ms to 20 ms, and $T1=T2=0.5T$.

Another aspect of the present application further relates to electronic skin including the sensor with a time-sharing regional shielding function described above. Since the improvements merely involve the sensor on the artificial skin, other components can be those well-known in the prior art. Therefore, other components of the electronic skin will not be described in the present application.

Still another aspect of the present application further relates to an intelligent robot including the electronic skin. Since the improvements merely involve the touch sensor on the electronic skin, other components can be those well-known in the prior art. Therefore, other components of the intelligent robot will not be described in the present application.

Yet another aspect of the present application further relates to an artificial prosthesis including the electronic skin. Since the improvements merely involve the touch sensor on the electronic skin, other components can be those well-known in the prior art. Therefore, other components of the artificial prosthesis will not be described in the present application.

Finally, it is to be noted that the forgoing embodiments are merely for describing the technical solutions of the present application, and not intended to limit the protection scope of the present application. Although the present application has been described above in detail by the preferred embodiments, it should be understood by a person of ordinary skill in the art that modifications or equivalent replacements may be made to the technical solutions of the present application without departing from the essence and scope of the technical solutions of the present application.

The invention claimed is:

1. A sensor with a time-sharing regional shielding function, wherein the sensor comprises a plurality of sensor units, each of which comprises regions contained in four multifunctional layers; at least one parallel-plate capacitor is contained in each of the multifunctional layers; and, the multifunctional layers are connected to a processer through a first plurality of analog switches, and the processor is connected to an external circuit;

wherein a part of the plurality of sensor units are configured to operate in a measurement state in a measurement period T, and the rest of the plurality of sensor units are configured to operate in a shielded state in the same measurement period T; wherein the measurement period T consists of two sub periods T1 and T2;

wherein the multifunctional layers in each of the sensor units are configured to regionally shield the sensor through the time-sharing switching of the first plurality of analog switches and the control of a bus, in the period T1, the first multifunctional layer (1) of the sensor unit in the measurement state is configured to connect to an excitation signal for the multifunctional layers, the third multifunctional layer (3) of the sensor unit in the measurement state is configured to connect to an analog-to-digital conversion circuit, and the second multifunctional layer (2) and the fourth multifunctional layer (4) of the sensor unit in the measurement state are both grounded or the second multifunctional layer (2) and the fourth multifunctional layer (4) of the sensor unit in the measurement state are both configured to connect to excitation signals for common electrodes of the parallel-plate capacitors in the two multifunctional layers; and, a second plurality of analog switches that control the parallel-plate capacitors in the first multifunctional layer (1) and the third multifunctional layer (3) of the sensor unit in the measurement state are configured to be turned off, and a third plurality of analog switches that control the parallel-plate capacitors in the second multifunctional layer (2) and the fourth multifunctional layer (4) of the sensor unit in the measurement state are configured to connect to excitation signals for common electrodes of the parallel-plate capacitors in the two multifunctional layers;

in the period T2, the second multifunctional layer (2) of the sensor unit in the measurement state is configured to connect to the excitation signal for the multifunctional layers, the fourth multifunctional layer (4) of the sensor unit in the measurement state is configured to connect to the analog-to-digital conversion circuit, and the first multifunctional layer (1) and the third multifunctional layer (3) of the sensor unit in the measurement state are both grounded or the first multifunctional layer (1) and the third multifunctional layer (3) of the sensor unit in the measurement state are both configured to connect to excitation signals for common electrodes of the parallel-plate capacitors in the two multifunctional layers; and, the third plurality of analog switches that control the parallel-plate capacitors in the second multifunctional layer (2) and the fourth multifunctional layer (4) of the sensor unit in the measurement state are configured to be turned off, and the second plurality of analog switches that control the parallel-plate capacitors in the first multifunctional layer (1) and the third multifunctional layer (3) of the sensor unit in the measurement state are configured to connect to excitation signals for common electrodes of the parallel-plate capacitors in the two multifunctional layers; and in the measurement period T, the four multifunctional layers of the sensor unit in the shielded state are all grounded or configured to connect to excitation signals for common electrodes of the parallel-plate capacitors in the four multifunctional layers, and the common electrodes of the parallel-plate capacitors in the four multifunctional layers are configured to connect to corresponding excitation signals for the common electrodes, so that the sensor unit in the shielded state can measure the change in three-dimensional force.

2. The sensor with a time-sharing regional shielding function according to claim 1, wherein the measurement period T is 1 ms to 20 ms, and T1=T2=0.5T.

3. The sensor with a time-sharing regional shielding function according to claim 1 or 2, wherein two layers of electrodes are arranged in each of the multifunctional layers, the upper layer comprising cross common electrodes (6), the lower layer comprising four separate electrodes (7) corresponding to the cross common electrodes (6) in the upper layer, and the cross common electrodes (6) in the upper layer and the four separate electrodes (7) in the lower layer forming four parallel-plate capacitors.

4. The sensor with a time-sharing regional shielding function according to claim 3, wherein the region contained in each of the multifunctional layers comprises an upper portion (11) and a bottom portion corresponding to the multifunctional layer; the upper portion (1) is made of a flexible conducting material, and a protective layer (12) made of a flexible insulating material is arranged outside the flexible conducting material; the bottom portion comprises multiple layers of PCB or FPC boards; a flexible insulating layer (17) is arranged below the PCB or FPC boards, a ground-shielding layer (18) controlled by an analog switch is arranged below the flexible insulating layer (17), and an insulating protective layer (19) is arranged below the ground-shielding layer (18) controlled by the analog switch; annular electrodes 141 corresponding to the multifunctional layers are arranged on the PCB or FPC boards in the first layer, circular electrodes (151) are arranged on the PCB or FPC boards in the second layer, and vias (152) are formed on the circular electrodes (151); the annular electrodes (141 and the circular electrodes (151) are connected through the vias (152) to form independent conducting regions; the upper portion (11) is electrically connected to the bottom portion; the cross common electrodes (6) in the upper layer are electrically connected to the PCB or FPC boards in the first layer through central conducting columns (20) in the multifunctional layers; and, the separate electrodes (7) in the lower layer are directly arranged on the PCB or FPC boards in the first layer.

5. The sensor with a time-sharing regional shielding function according to claim 4, wherein the flexible conducting material is an organic conductive silver adhesive material, and a conductive silver adhesive bonding layer is arranged between the organic conductive silver adhesive material and the multifunctional layers.

6. The sensor with a time-sharing regional shielding function according to claim 4, wherein the ground-shielding layer controlled by the analog switch is an organosilicone conductive silver adhesive shielding layer, and the insulating protective layer is a PDMS protective layer.

7. The sensor with a time-sharing regional shielding function according to claim 4, wherein the upper portions (11) and bottom portions of the multifunctional layers are bonded or crimped by a conductive adhesive to form electrical connections; and, the conducting columns (20) are electrically connected to the PCB or FPC boards in the first layer by welding, crimping or a conductive adhesive.

8. The sensor with a time-sharing regional shielding function according to claim 1 or 2, wherein the first multifunctional layer (1) and the third multifunctional layer (3) are arranged at a same height and opposite to each other, and the second multifunctional layer (2) and the fourth multifunctional layer (4) are arranged at a same height and opposite to each other; the distance from the center of the first multifunctional layer (2) to the center of the third multifunctional layer (3) is d1, the distance from the center of the second multifunctional layer (2) to the center of the fourth multifunctional layer (4) is d2, and the ratio of d1 to d2 is 1.2 to 5; and, the height of the first multifunctional layer (1) and the third multifunctional layer (3) is h1, the height of the second multifunctional layer (2) and the fourth multifunctional layer (4) is h2, and the difference between h1 and h2 is 1 mm to 3 mm.

9. Electronic skin, comprising a sensor with a time-sharing regional shielding function according to claim 1, wherein
the sensor comprises a plurality of sensor units, each of which comprises regions contained in four multifunctional layers; at least one parallel-plate capacitor is contained in each of the multifunctional layers; and, the multifunctional layers are connected to a processor through a first plurality of analog switches, and the processor is connected to an external circuit;
wherein a part of the plurality of sensor units are configured to operate in a measurement state in a measurement period T, and the rest of the plurality of sensor units are configured to operate in a shielded state in the same measurement period T; wherein the measurement period T consists of two sub periods T1 and T2;
wherein the multifunctional layers in each of the sensor units are configured to regionally shield the sensor through the time-sharing switching of the first plurality of analog switches and the control of a bus, in the period T1, the first multifunctional layer (1) of the sensor unit in the measurement state is configured to connect to an excitation signal for the multifunctional layers, the third multifunctional layer (3) of the sensor unit in the measurement state is configured to connect to an analog-to-digital conversion circuit, and the second multifunctional layer (2) and the fourth multifunctional layer (4) of the sensor unit in the measurement state are both grounded or the second multifunctional layer (2) and the fourth multifunctional layer (4) of the sensor unit in the measurement state are both configured to connect to excitation signals for common electrodes of the parallel-plate capacitors in the two multifunctional layers; and, a second plurality of analog switches that control the parallel-plate capacitors in the first multifunctional layer (1) and the third multifunctional layer (3) of the sensor unit in the measurement state are configured to be turned off, and a third plurality of analog switches that control the parallel-plate capacitors in the second multifunctional layer (2) and the fourth multifunctional layer (4) of the sensor unit in the measurement state are configured to connect to excitation signals for common electrodes of the parallel-plate capacitors in the two multifunctional layers;
in the period T2, the second multifunctional layer (2) of the sensor unit in the measurement state is configured to connect to the excitation signal for the multifunctional layers, the fourth multifunctional layer (4) of the sensor unit in the measurement state is configured to connect to the analog-to-digital conversion circuit, and the first multifunctional layer (1) and the third multifunctional layer (3) of the sensor unit in the measurement state are both grounded or the first multifunctional layer (1) and the third multifunctional layer (3) of the sensor unit in the measurement state are both configured to connect to excitation signals for common electrodes of the parallel-plate capacitors in the two multifunctional layers; and, the third plurality of analog switches that control the parallel-plate capacitors in the second multifunctional layer (2) and the fourth multifunctional layer (4) of the sensor unit in the measurement state are configured to be turned off, and the second plurality of analog switches that control the parallel-plate capacitors in the first multifunctional layer (1) and the third multifunctional layer (3) of the sensor unit in the measurement state are configured to connect to excitation signals for common electrodes of the parallel-plate capacitors in the two multifunctional layers; and
in the measurement period T, the four multifunctional layers of the sensor unit in the shielded state are all grounded or configured to connect to excitation signals for common electrodes of the parallel-plate capacitors in the four multifunctional layers, and the common electrodes of the parallel-plate capacitors in the four multifunctional layers are configured to connect to corresponding excitation signals for the common electrodes, so that the sensor unit in the shielded state can measure the change in three-dimensional force.

10. A robot, comprising an electronic skin the electronic skin comprising a sensor with a time-sharing regional shielding function, the sensor comprises a plurality of sensor units, each of which comprises regions contained in four multifunctional layers; at least one parallel-plate capacitor is contained in each of the multifunctional layers; and, the multifunctional layers are connected to a processer through a first plurality of analog switches, and the processor is connected to an external circuit:
wherein a part of the plurality of sensor units are configured to operate in a measurement state in a measurement period T, and the rest of the plurality of sensor units are configured to operate in a shielded state in the same measurement period T; wherein the measurement period T consists of two sub periods T1 and T2;
wherein the multifunctional layers in each of the sensor units are configured to regionally shield the sensor through the time-sharing switching of the first plurality of analog switches and the control of a bus, in the period T1, the first multifunctional layer (1) of the sensor unit in the measurement state is configured to connect to an excitation signal for the multifunctional layers, the third multifunctional layer (3) of the sensor unit in the measurement state is configured to connect to an analog-to-digital conversion circuit, and the second multifunctional layer (2) and the fourth multifunctional layer (4) of the sensor unit in the measurement state are both grounded or the second multifunctional layer (2) and the fourth multifunctional layer (4) of the sensor unit in the measurement state are both configured to connect to excitation signals for common electrodes of the parallel-plate capacitors in the two multifunctional layers; and, a second plurality of analog switches that control the parallel-plate capacitors in the first multifunctional layer (1) and the third multifunctional layer (3) of the sensor unit in the measurement state are configured to be turned off, and a third plurality of analog switches that control the parallel-plate capacitors in the second multifunctional layer (2) and the fourth multifunctional layer (4) of the sensor unit in the measurement state are configured to connect to excitation signals for common electrodes of the parallel-plate capacitors in the two multifunctional layers;

in the period T2, the second multifunctional layer (2) of the sensor unit in the measurement state is configured to connect to the excitation signal for the multifunctional layers, the fourth multifunctional layer (4) of the sensor unit in the measurement state is configured to connect to the analog-to-digital conversion circuit, and the first multifunctional layer (1) and the third multifunctional layer (3) of the sensor unit in the measurement state are both grounded or the first multifunctional layer (1) and the third multifunctional layer (3) of the sensor unit in the measurement state are both configured to connect to excitation signals for common electrodes of the parallel-plate capacitors in the two multifunctional layers; and, the third plurality of analog switches that control the parallel-plate capacitors in the second multifunctional layer (2) and the fourth multifunctional layer (4) of the sensor unit in the measurement state are configured to be turned off, and the second plurality of analog switches that control the parallel-plate capacitors in the first multifunctional layer (1) and the third multifunctional layer (3) of the sensor unit in the measurement state are configured to connect to excitation signals for common electrodes of the parallel-plate capacitors in the two multifunctional layers; and in the measurement period T, the four multifunctional layers of the sensor unit in the shielded state are all grounded or configured to connect to excitation signals for common electrodes of the parallel-plate capacitors in the four multifunctional layers, and the common electrodes of the parallel-plate capacitors in the four multifunctional layers are configured to connect to corresponding excitation signals for the common electrodes, so that the sensor unit in the shielded state can measure the change in three-dimensional force.

11. An artificial prosthesis, comprising an electronic skin, the electronic skin comprising a sensor with a time-sharing regional shielding function, the sensor comprises a plurality of sensor units, each of which comprises regions contained in four multifunctional layers; at least one parallel-plate capacitor is contained in each of the multifunctional layers; and, the multifunctional layers are connected to a processer through a first plurality of analog switches, and the processor is connected to an external circuit;

wherein a part of the plurality of sensor units are configured to operate in a measurement state in a measurement period T, and the rest of the plurality of sensor units are configured to operate in a shielded state in the same measurement period T; wherein the measurement period T is consisted of two sub periods T1 and T2;

wherein the multifunctional layers in each of the sensor units are configured to regionally shield the sensor through the time-sharing switching of the first plurality of analog switches and the control of a bus, in the period T1, the first multifunctional layer (1) of the sensor unit in the measurement state is configured to connect to an excitation signal for the multifunctional layers, the third multifunctional layer (3) of the sensor unit in the measurement state is configured to connect to an analog-to-digital conversion circuit, and the second multifunctional layer (2) and the fourth multifunctional layer (4) of the sensor unit in the measurement state are both grounded or the second multifunctional layer (2) and the fourth multifunctional layer (4) of the sensor unit in the measurement state are both configured to connect to excitation signals for common electrodes of the parallel-plate capacitors in the two multifunctional layers; and, a second plurality of analog switches that control the parallel-plate capacitors in the first multifunctional layer (1) and the third multifunctional layer (3) of the sensor unit in the measurement state are configured to be turned off, and a third plurality of analog switches that control the parallel-plate capacitors in the second multifunctional layer (2) and the fourth multifunctional layer (4) of the sensor unit in the measurement state are configured to connect to excitation signals for common electrodes of the parallel-plate capacitors in the two multifunctional layers;

in the period T2, the second multifunctional layer (2) of the sensor unit in the measurement state is configured to connect to the excitation signal for the multifunctional layers, the fourth multifunctional layer (4) of the sensor unit in the measurement state is configured to connect to the analog-to-digital conversion circuit, and the first multifunctional layer (1) and the third multifunctional layer (3) of the sensor unit in the measurement state are both grounded or the first multifunctional layer (1) and the third multifunctional layer (3) of the sensor unit in the measurement state are both configured to connect to excitation signals for common electrodes of the parallel-plate capacitors in the two multifunctional layers; and, the third plurality of analog switches that control the parallel-plate capacitors in the second multifunctional layer (2) and the fourth multifunctional layer (4) of the sensor unit in the measurement state are configured to be turned off, and the second plurality of analog switches that control the parallel-plate capacitors in the first multifunctional layer (1) and the third multifunctional layer (3) of the sensor unit in the measurement state are configured to connect to excitation signals for common electrodes of the parallel-plate capacitors in the two multifunctional layers; and in the measurement period T, the four multifunctional layers of the sensor unit in the shielded state are all grounded or configured to connect to excitation signals for common electrodes of the parallel-plate capacitors in the four multifunctional layers, and the common electrodes of the parallel-plate capacitors in the four multifunctional layers are configured to connect to corresponding excitation signals for the common electrodes, so that the sensor unit in the shielded state can measure the change in three-dimensional force.

* * * * *